(12) United States Patent
Kondoh et al.

(10) Patent No.: US 8,713,563 B2
(45) Date of Patent: Apr. 29, 2014

(54) DATA PROCESSOR WITH VIRTUAL MACHINE MANAGEMENT

(75) Inventors: Yuki Kondoh, Hino (JP); Takashi Matsumoto, Kawasaki (JP); Keisuke Toyama, Yokohama (JP); Toru Nojiri, Tokyo (JP)

(73) Assignee: Renesas Electronics Corporation, Kawasaki-shi (JP)

( * ) Notice: Subject to any disclaimer, the term of this patent is extended or adjusted under 35 U.S.C. 154(b) by 1385 days.

(21) Appl. No.: 11/869,565

(22) Filed: Oct. 9, 2007

(65) Prior Publication Data

US 2008/0086729 A1    Apr. 10, 2008

(30) Foreign Application Priority Data

Oct. 10, 2006   (JP) ................ 2006-276066

(51) Int. Cl.
 *G06F 9/455*   (2006.01)
(52) U.S. Cl.
 USPC ............................................. 718/1
(58) Field of Classification Search
 None
 See application file for complete search history.

(56) References Cited

U.S. PATENT DOCUMENTS

| | | | |
|---|---|---|---|
| 4,835,667 A | 5/1989 | Sato et al. | |
| 5,701,493 A | 12/1997 | Jaggar | |
| 5,924,127 A * | 7/1999 | Kawamoto et al. | 711/207 |
| 7,149,862 B2 | 12/2006 | Tune et al. | |
| 2003/0217250 A1* | 11/2003 | Bennett et al. | 712/224 |
| 2004/0225768 A1 | 11/2004 | Kondoh | |
| 2005/0076186 A1* | 4/2005 | Traut | 712/1 |
| 2006/0123416 A1* | 6/2006 | Cibrario Bertolotti et al. | 718/1 |
| 2006/0190532 A1 | 8/2006 | Chadalavada | |

FOREIGN PATENT DOCUMENTS

| | | | | |
|---|---|---|---|---|
| JP | 02-146634 A | 6/1990 | | |
| JP | 2002-073358 A | 3/2002 | | |
| JP | 2002-073358 | * 12/2002 | | G06F 9/46 |
| JP | 2004-334410 A | 11/2004 | | |

OTHER PUBLICATIONS

Andrew S. Tanenbaum, structured computer organization, 1984, second edition.*
Issued Office Action dated Feb. 13, 2014, for Taiwanese Application No. 096137873, with English language translation.

* cited by examiner

*Primary Examiner* — Emerson Puente
*Assistant Examiner* — Sisley Kim
(74) *Attorney, Agent, or Firm* — Miles & Stockbridge P.C.

(57) ABSTRACT

A data processor includes: a central processing unit (CPU), in which a plurality of virtual machines (101), each running an application program under controls of different operating systems, and a virtual machine manager (190) for controlling the plurality of virtual machines are selectively arranged according to information set in mode registers (140, 150, 151); and a resource access management module (110) for managing access to hardware resource available for the plurality of virtual machines. The resource access management module accepts, as inputs, the information set in the mode registers and access control information of the central processing unit to the hardware resource, compares the information thus input with information set in a control register, and controls whether or not to permit access to the hardware resource in response to the access control information. As a result, redesign involved in changes in system specifications can be reduced, and a malfunction owing to resource contention can be prevented. The invention contributes to increase of security.

15 Claims, 27 Drawing Sheets

FIG. 2
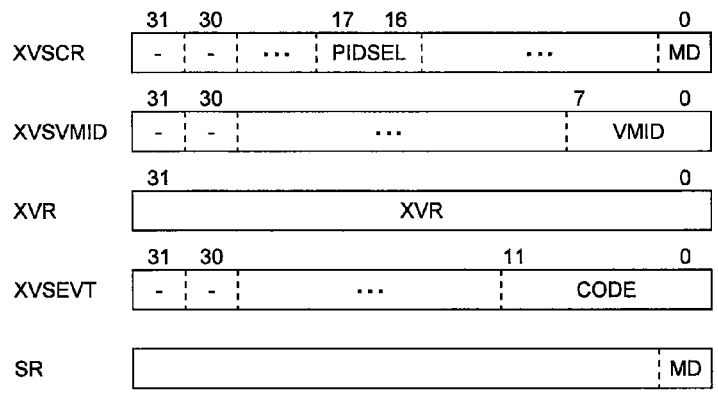
FIG. 4
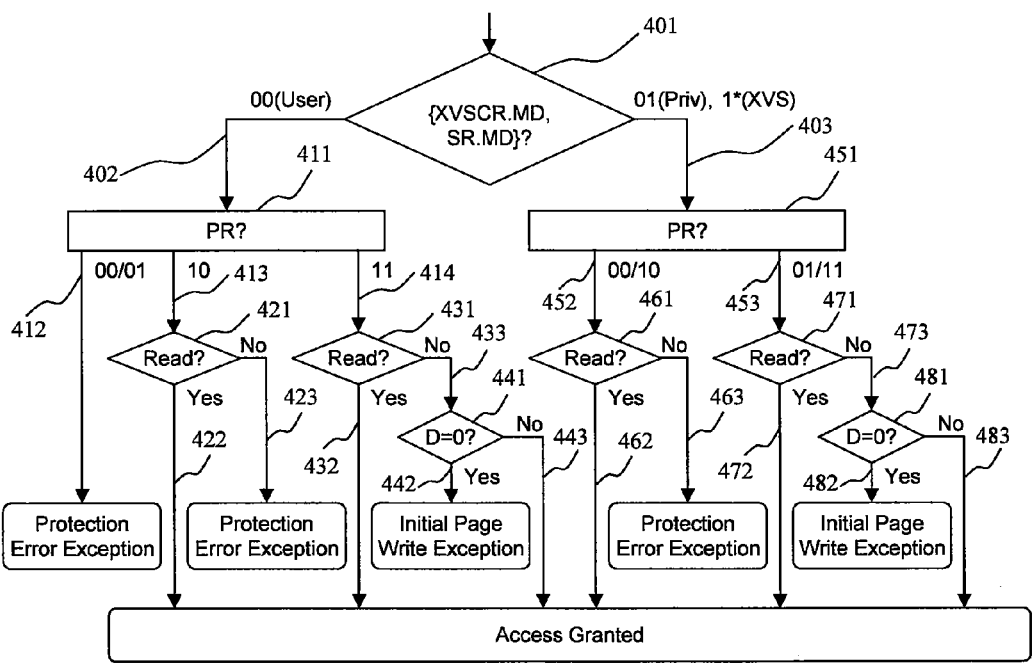
FIG. 8
| XVSCR.PIDSEL | Mode | pid |
|---|---|---|
| 00, 01 | VMID8 | pid[7:0] = XVSVMID.VMID[7:0] |
| 10 | VMID4+ASID4 | pid[7:4] = XVSVMID.VMID[3:0], pid[3:0] = ASID[7:4] |
| 11 | ASID8 | pid[7:0] = ASID[7:0] |

FIG. 9
| Address | Bit | Name |
|---|---|---|
| +H'0 | 31~16 | ADDR[31:16] |
|  | 15~0 | - |
| +H'4 | 31~16 | AMSK[31:16] |
|  | 15~0 | - |
| +H'8 | 31~24 | SRC[7:0] |
|  | 23 | SMSK |
|  | 22~16 | - |
|  | 15~8 | PID[7:0] |
|  | 7 | PMSK |
|  | 6~0 | - |
| +H'C | 31~16 | OFFSET[31:16] |
|  | 15~2 | - |
|  | 1 | PR |
|  | 0 | PW |
FIG. 16
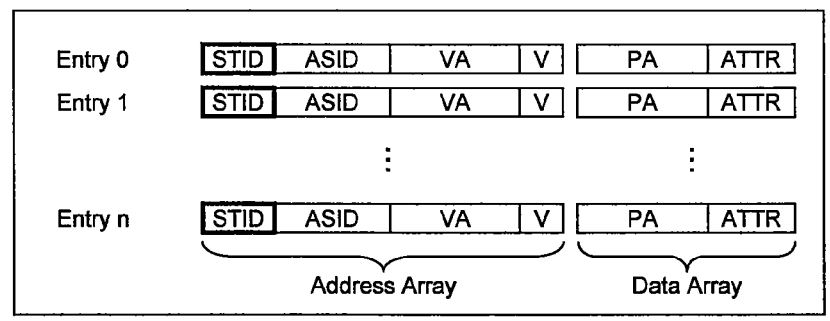
FIG. 17
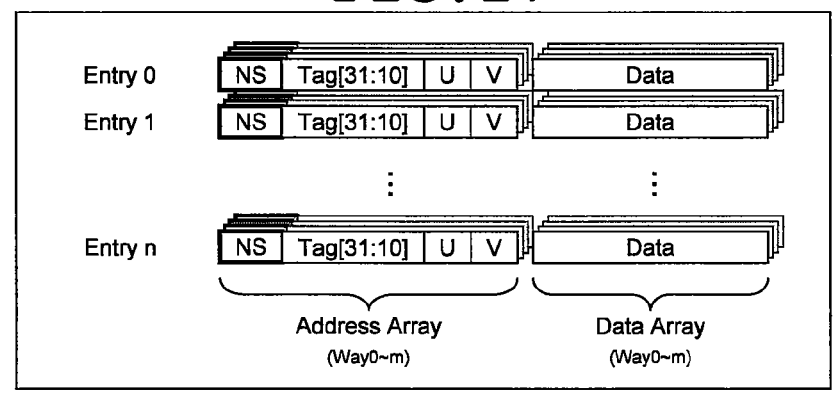

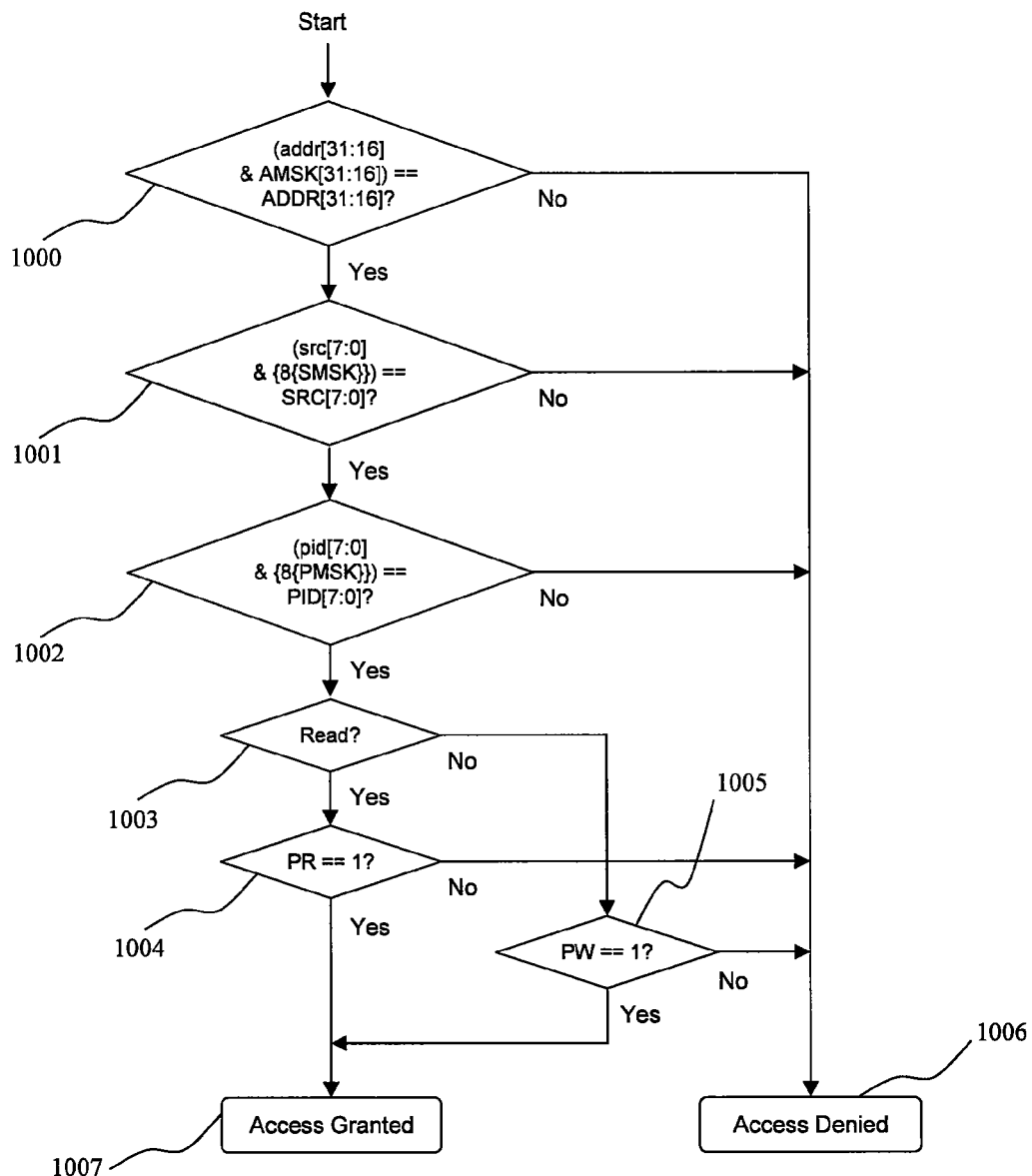

FIG. 14

| Category | Mode | Exception | Vector Address (w/XVS support) |
|---|---|---|---|
| Reset | Abort type | Power-on reset | XVR |
| | | Manual reset | XVR |
| | | Instr. TLB multiple-hit | XVR |
| | | Data TLB multiple hit exception | XVR |
| General Exception | Re-execution type | User break before instr. Execution | XVR |
| | | Instr. address error | XVR |
| | | Instr. TLB miss | XVR |
| | | Instr. TLB protection violation | XVR |
| | | Privileged instr. hook | XVR |
| | | General illegal instr. | XVR |
| | | Slot illegal instr. | XVR |
| | | General FPU disable | XVR |
| | | Slot FPU disable | XVR |
| | | Data address error (read) | XVR |
| | | Data address error (write) | XVR |
| | | Data TLB miss (read) | XVR |
| | | Data TLB miss (write) | XVR |
| | | Data TLB protection violation (read) | XVR |
| | | Data TLB protection violation (write) | XVR |
| | | System register access hook | XVR |
| | | FPU exception | XVR |
| | | Initial page write exception | XVR |
| | Completion type | XVS system call trap | XVR |
| | | Unconditional trap | XVR |
| | | User break after instr. Execution | XVR |
| | Asyncronous type | Bus access permission violation | XVR |
| | | Asyncronous user break | XVR |
| Interruption | Completion type | Non-maskable interrupt | XVR |
| | | General interrupt request | XVR |

FIG.19

VM Definition File

VM1:
 CPU: Core0
 PMem_Start: 0x00000000
 PMem_Size: 0x04000000
 VMem_Start: 0x00000000
 Exclusive I/O: I/O Dev1
 Partitioned I/O: I/O Dev0
 Shared I/O: I/O Dev4

VM2:
 CPU: Core1
 PMem_Start: 0x04000000
 PMem_Size: 0x04000000
 VMem_Start: 0x00000000
 Exclusive I/O: I/O Dev2
 Partitioned I/O: I/O Dev0
 Shared I/O: I/O Dev4

VM3:
 CPU: Core1, Core2
 PMem_Start: 0x08000000
 PMem_Size: 0x08000000
 VMem_Start: 0x00000000
 Exclusive I/O: I/O Dev3
 Partitioned I/O: I/O Dev0
 Shared I/O: I/O Dev4

FIG.27

| | SRC | SMSK | PID | PMSK | PR | PW | Access Restriction |
|---|---|---|---|---|---|---|---|
| (1) | H'00 | B'0 | H'00 | B'0 | B'1 | B'1 | No |
| (2) | H'03 | B'1 | H'00 | B'0 | B'1 | B'1 | VM of CPU of src= H'03: Read/Write Granted |
| (3) | H'00 | B'0 | H'02 | B'1 | B'1 | B'1 | VM of pid= H'02: Read/Write Granted |
| (4) | H'05 | B'1 | H'0A | B'1 | B'1 | B'1 | VM of pid=H'0A of CPU of src= H'05: Read/Write Granted |
| (5) | H'1B | B'1 | H'77 | B'1 | B'1 | B'0 | VM of pid=H'77 of CPU of src= H'1B: Read Granted |

2500 2502 2504 2506 2508 2510

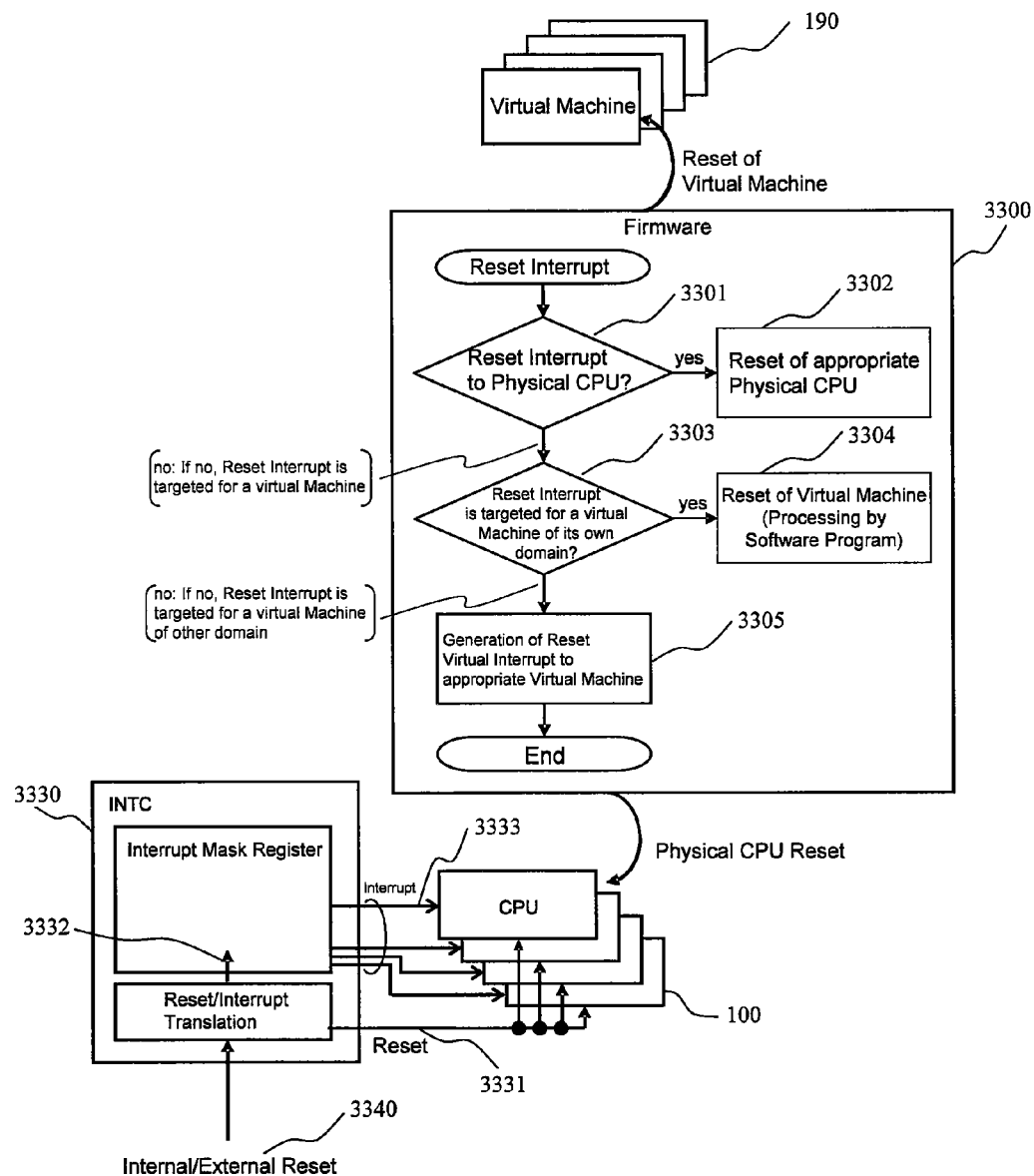

DATA PROCESSOR WITH VIRTUAL MACHINE MANAGEMENT

CLAIM OF PRIORITY

The Present application claims priority from Japanese application JP2006-276066 filed on Oct. 10, 2006, the content of which is hereby incorporated by reference into this application.

FIELD OF THE INVENTION

The present invention relates to a data processor with a plurality of CPUs (CPU: Central Processing Unit), on which a program can be made to run even under the control of different operating systems. Specifically, it relates to a technique useful, for instance, for application to a microprocessor integrated into a semiconductor IC having multi CPUs formed on a single semiconductor chip (IC: Integrated Circuit).

BACKGROUND OF THE INVENTION

In recent years, integration of microprocessors has been proceeding. In such trend, a plurality of microprocessors each having one CPU have been integrated into a system, and a microprocessor equipped with CPUs has been developed. As for a microprocessor having CPUs, it is common that a memory and an I/O device which CPUs use are shared. A main reason for making arrangement like this is the restriction of the number of terminals with respect to the area of an LSI. Hence, the sharing as described above is materialized chiefly by designs of a bus and controller inside a microprocessor. In contrast, sharing a memory would bring on e.g. a problem that image data are not processed correctly when a bug of a controlling software program or the like causes an improper access, leading to a collision in a memory region. Therefore, it is important to avoid a collision in a memory region. In JP 2004-334410 is disclosed a technique for a circuit to detect and block an access to an improper address with a small overhead in circuit volume.

In contrast, to run a program on a microprocessor having CPUs, an operating system supporting such microprocessor is required. The design of such operating system has a deep connection with the forementioned form of sharing a memory and an I/O device. In regard to the form of an operating system supporting a microprocessor with CPUS, there have been the following two systems conventionally.

The first form is a symmetric multiprocessor system that a single operating system manages all of CPUs, a memory and an I/O device. The second form is an asymmetric multiprocessor system that an operating system is installed for each CPU. Especially, the asymmetric multiprocessor system has been adopted for microprocessors for embedded devices conventionally because of the ease of transfer of a software asset.

SUMMARY OF THE INVENTION

The asymmetric multiprocessor system as described above, especially a system having a memory and an I/O device shared by hardware units as microprocessors has the following two problems.

The first problem is that the operating system and hardware must be redesigned even when changing specifications on a small scale because there is a strong dependence between the form of an operating system and the form of sharing of a memory and an I/O device by hardware units. The second problem is that, originally in a system with a plurality of discrete CPUs, memories and I/O devices have been provided respectively, however, the system reliability and security are deteriorated by sharing of a memory and an I/O device as a result of integration. Specifically, when neither memory nor I/O device is shared, an unintended action by an operating system or a program, which is running on a certain CPU, never influences an operating system and a program working on another CPU, while if the memory and I/O device are shared, such unintended action will have the influences.

It is an object of the invention to reduce the need for redesign involved in a change of system specifications, in regard to a data processor on which a program can be executed using a shared resource under the control of different operating systems.

It is another object of the invention to increase the reliability of the system from the viewpoint of preventing a malfunction owing to resource contention, in regard to a data processor on which a program can be executed using a shared resource under the control of different operating systems.

Also, it is another object of the invention to improve the security, in regard to a data processor on which a program can be executed using a shared resource under the control of different operating systems.

The above and other objects and novel features of the invention will be apparent from the descriptions hereof and the accompanying drawings.

Of embodiments disclosed therein, the representative ones will be described below in brief outline. The forementioned problems are solved by a combination of hardware expansion concerning CPUs incorporated in a data processor and a software program for controlling the expanded portion. The hardware expansion associated with CPUs is principally divided into the following two types.

(a) Expansion of operating mode, aiming at having a software program for controlling the expanded portion work (b) Expansion, intended to detect a particular action of a program (application program) executed by or under the control of an operating system to transfer a process in connection with the action to a software program having control of the expanded portion (a program which materializes a virtual machine manager).

[1] Now, a data processor according to one aspect of the invention will be described further in detail. The data processor (1) has: a central processing unit (CPU), in which a plurality of virtual machines (101), each running an application program under controls of different operating systems, and a virtual machine manager (190) for controlling the plurality of virtual machines are selectively arranged according to information set in mode registers (140, 150, 151); and a resource access management module (110) for managing access to hardware resource available for the plurality of virtual machines. The resource access management module accepts, as inputs, the information set in the mode registers and access control information of the central processing unit to the hardware resource, compares the information thus input with information set in a control register (111), and controls whether or not to permit access to the hardware resource in response to the access control information. Therefore, when the virtual machine executes a program using the shared hardware resource under the controls of different operating systems, it is possible to reduce the contention of undesired accesses with respect to the hardware resource, loss of work data, and the like according to the settings stored in the control register. The change of part of the virtual machines has no influence on other virtual machines. Further, even when the virtual machine manager which controls the plurality of virtual machines is changed in design of its control action, it is possible to cope with such change only by the change of part of the plurality of virtual machines.

As a specific form according to the invention, the control register is arranged so that the virtual machine manager can change information set therein. Therefore, if a malicious attack on a particular application program and operating system is successful, it is difficult for an unintended action of a virtual machine constituted by a certain central processing unit and working on it to affect an action of other virtual machine through a shared hardware resource. On this account, the invention can contribute to reinforcement of security.

As a specific form according to the invention, on receipt of a signal for interrupt, the central processing unit constitutes the virtual machine manager and judges a factor of the interrupt. When the interrupt factor is judged as being a first interrupt factor, the central processing unit executes an instruction of the operating system to respond the interrupt. When the interrupt factor is judged as being a second interrupt factor, the virtual machine manager performs a process to respond the interrupt. A response to an interrupt by an operating system and a response to an interrupt by a virtual machine manager can be distinguished and separated. Therefore, as for a response to an interrupt, it is guaranteed that the virtual machines can be designed separately from the virtual machine manager.

As a specific form according to the invention, the mode registers include: a virtual machine ID register (140) for specifying one of the plurality of virtual machines; a CPU operating mode register (151) for showing, on the plurality of virtual machines, whether the application program can be run, and whether the operating system can be run; and an expanded CPU operating mode register (150) for showing whether to form the virtual machine manager or to form the virtual machine.

As a specific form according to the invention, when the data processor includes a plurality of central processing units identical to the central processing unit described above, the access control information to the hardware resource output by the central processing unit includes identification code information (src) of the central processing unit in question. Thus, even when different CPUs have the same virtual machine ID, such issue can be dealt with readily. In this case, the control register has a register region (SRC) for storing identification code information of the central processing unit constituting the virtual machine having permission of access to a memory region as the hardware resource.

As a further specific form according to the invention, the control register has a register region (OFFSET) for storing address offset information to a memory region specific to the virtual machine with respect to a head address of a memory region as the hardware resource. The addresses of the individual virtual machines may be managed with respect to an address space starting with the address zero (0).

As a specific form according to the invention, the data processor further includes: an internal bus (BUS) connecting between the central processing unit and the resource access management module; and a memory (120) and I/O circuits (130, 131) as hardware resources connected to the resource access management module, and is formed into one semiconductor chip. For instance, in the case of one chip, the need for plurality of virtual machines to share a hardware resource is higher from the viewpoint of the areal efficiency compared to multiple chips.

[2] A data processor according to another aspect of the invention includes: a plurality of central processing units which can run a program conforming to a set operating mode under controls of different operating systems; and a resource access management module which manages access to a hardware resource available for the plurality of central processing units. The resource access management module accepts, as inputs, information corresponding to the set operating mode, and access control information of the plurality of central processing units to the hardware resource, compares the information thus input with information set in a control register, and controls whether or not to permit access to the hardware resource in response to the access control information. Thus, when the virtual machine executes a program using the shared hardware resource under the controls of different operating systems, it is possible to reduce the contention of undesired accesses with respect to the hardware resource, loss of work data, and the like according to the settings stored in the control register. The change in part of the operating systems or the change of the program executed under the controls of the operating systems has no influence on other operating systems and other programs executed under the control thereof. Such change can be dealt with by changing the design of a control action for the resource access management module.

As a specific form according to the invention, the operating mode is one selected from a group consisting of a first operating mode (user mode), a second operating mode (privileged mode) and a third operating mode (virtual machine manager mode). In the first operating mode, the plurality of central processing units follow an application program to execute an instruction. In the second operating mode, the plurality of central processing units follow an operating system to execute an instruction. In the third operating mode, execution of an instruction in the first operating mode and execution of an instruction in the second operating mode are controlled.

As further specific form according to the invention, the control register can be changed in the third operating mode. Therefore, if a malicious attack on a particular application program and operating system is successful, it is difficult for an unintended action of a virtual machine constituted by a certain central processing unit and working on it to affect an action of other virtual machine through a shared hardware resource. On this account, the invention can contribute to reinforcement of security.

BRIEF DESCRIPTION OF THE DRAWINGS

FIG. 2 is an illustration of assistance in explaining system registers for XVS setting (XVSCR, XVSVMID, XVR and XVSEVT);

FIG. 4 is a flow chart showing an example of an algorithm for authority-of-access judgment by TLB entry VMID field and CPU authority field;

FIG. 8 is an illustration of assistance in explaining an access attribute information output mode (VMID8, VMID4+ ASID4, ASID8);

FIG. 9 is an illustration of assistance in explaining the configuration of PAM entries;

FIG. 10 is a flow chart showing examples of Access Granted-judging algorithm (typical steps of access granted, access denied, and access with an offset added) by PAM;

FIG. 14 is an illustration of assistance in explaining an exception factor for transition to the virtual machine manager mode (XVS MODE);

FIG. 16 is an illustration of assistance in explaining TLB entry with STID field added;

FIG. 17 is an illustration of assistance in explaining a cache entry with NS field added;

FIG. 19 is an illustration of assistance in explaining VM definition file, showing forms for specifying and managing hardware resources (memory, I/O, CPU) to be assigned to virtual machines (VM);

FIG. 27 is an illustration showing an example of setting of an entry table in PAM module;

FIG. 33 is an illustration showing examples of the configuration of a reset-select mechanism and a process flow.

DETAILED DESCRIPTION OF THE PREFERRED EMBODIMENTS

Figure 1:
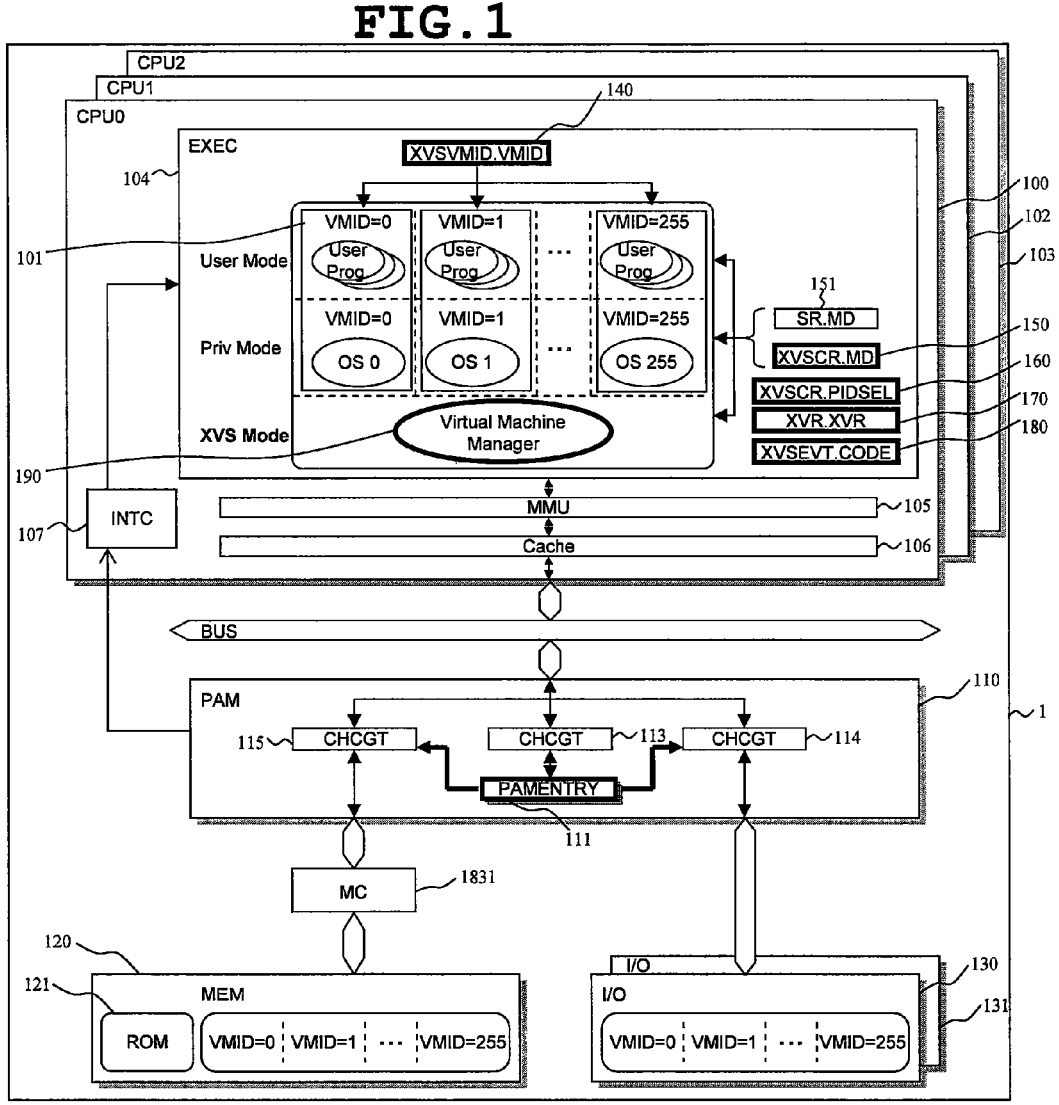
FIG. 1 is a block diagram showing a microprocessor according to an embodiment of the invention on the whole.

The arrangements according to the invention are presented by FIGS. 1 to 15 from the aspect of the hardware. FIG. 1 shows an example of the hardware configuration of a microprocessor according to the invention.

The microprocessor 1 is formed on a chip of semiconductor such as monocrystalline silicon by e.g. a manufacturing technique for CMOS ICs. The microprocessor 1 has three central processing units (CPU0, CPU1 and CPU2) 100, 102 and 103, and a physical address management module (PAM) 110, which are shown representatively and connected to an internal bus BUS in common. The physical address management module (PAM) 110 is connected with a memory (MEM) 120 and I/O circuits (I/O) 130 and 131, which are hardware resources shared by CPUs 100, 102 and 103. Between the physical address management module (PAM) 110 and the memory (MEM) 120 is disposed a memory controller (MC) 1831. The memory controller 1831 controls a memory interface such as the width of the bus according to the type of the memory. Now, it is noted that when the central processing units (CPU0, CPU1 and CPU2) 100, 102 and 103 are referred to as individually or generically, they are also represented as "central processing unit (CPU)" simply. The memory (MEM) 120 and I/O circuits (I/O) 130 and 131 as shared hardware resources may be formed on a chip different from the microprocessor 1.

The central processing units 100, 102 and 103 perform data processing based on data and a program stored on the memory (MEM) 120 as a main storage, and handle various devices (peripheral devices), which are not shown in the drawing, but connected with the central processing units through the I/O devices (I/O) 130 and 131. In each of CPUs 100, 102 and 103 are provided an execution section (EXEC) 104 which carries out an operational process, a memory management unit (MMU) 105 which performs virtual address management, a cache memory (Cache) 106 for speeding up the access to the memory (MEM) 120, which is a main storage, and an interrupt controller (INTC) 107 which arbitrates interrupt requests from various devices.

Particularly, in the execution section 104 shown in FIG. 1, a operating mode of the central processing unit (CPU) and an architecture resource are shown; in the physical address management module (PAM) 110 working in cooperation with CPU, a parameter entry register 111 for storing a parameter entry (PAMENTRY) and check gate circuits (CHCGT) 113, 114 and 115 are shown. Here, the asymmetric multi CPU architecture is adopted for the central processing units 100, 102 and 103, and therefore CPUs 100, 102 and 103 use operating systems (OS) independently of each other. Now, the word "operating system" is herein abbreviated as "OS" for short. In the example shown in FIG. 1, CPU 100 selectively forms virtual machines 101 for executing a user program (User Prog) as an application program according to the settings of mode registers under the controls of different operating systems (OS0 to OS255). The virtual machine 101 represents means for materialization of a function, which consists of an application program, an operating system and a central processing unit (CPU). Herein, the virtual machines 101 are discriminated by virtual machine IDs (VMID), and the virtual machines with VMID=0 to 255 can be selected. Also, the central processing unit (CPU) can selectively form a virtual machine manager 190 for controlling the virtual machines according to the settings of the mode registers. The virtual machine manager 190 represents means for materialization of a function, which consists of a virtual machine manager program and a central processing unit (CPU). The virtual machine manager 190 may be formed only for a certain central processing unit, otherwise the only function thereof may be arranged by all the central processing units. In the latter case, the central processing unit selected according to the mode resisters so as to form a virtual machine manager 190 will run a program module which needs a virtual machine manager program thereby to perform data processing.

In FIG. 1 no bus master module is shown aside from CPUs. However, a bus master device other than CPUs, such as a direct memory access controller (DMAC) or a controller having an addressing function, may be included actually. Such bus master device is controlled by the virtual machine running a user program, and outputs access control information to the bus BUS. The access control information is the same as the information about access by the virtual machine. In short, the bus master module other than CPUs takes a form of access equivalent to access by a virtual machine formed by CPUs, and therefore the physical address management module 110 suffices as long as it equally functions to bus access by the bus master module and bus access by CPUs.

As the mode registers, an XVSVMID.VMID register 140, an XVSCR.MD register 150, and a SR.MD register 151 are prepared. An XVSCR.PIDSEL resister 160, an XVR.XVR resister 170, and an XVSEVT.CODE resister 180 are provided as other architecture resource registers.

The SR.MD register 151 is a register of one bit; the value of which fixes the operating mode of CPU to a user mode (which is the first operating mode referred to by User Mode in the drawing) or a privileged mode (which is the second operating mode referred to by Priv Mode). The user mode is a mode that a typical application program (i.e. a user program) runs. In the user mode, the execution of a certain CPU instruction and the access to a particular CPU register resource are restricted. The privileged mode is a mode that a certain CPU instruction, which will affect the working condition of a CPU, can be executed. When the operating systems (OS0 to OS255) are activated, they are made to run in the privileged mode. The user program (User Prog) is designed so that it runs in the user mode, and therefore an action by the user mode program never influences an action of the operating system.

The XVSCR.MD register 150 is a register of one bit; the value of which decides whether the operating mode is a virtual machine manager mode (which is the third operating mode referred to by XVS Mode). The virtual machine manager mode is herein a mode intended to perform the control for assigning shared hardware resources, typified by the memory 120 and the I/O circuit 130, to the operating systems or virtual machines, the control for preventing an inappropriate action by an operating system or a program (or a virtual machine) from influencing another operating system or program (or virtual machine), and other things. In short, the virtual machine manager mode is a operating mode for controlling execution of an instruction in the user mode and execution of an instruction in the privileged mode.

The XVSVMID.VMID register 140 is a register of eight bits. The user mode and the privileged mode are each divided into 256 modes for VMID=0 to 255 depending on the value of the XVSVMID.VMID register. Specifically, there are the concrete cases as described below. In Case (1), when the XVSCR.MD register 150 holds a value of one, CPU is in the virtual machine manager mode (XVS Mode). In Case (2), when the XVSCR.MD register 150 has zero and the SR.MD register 151 keeps one, VMID=0 to 255 in the privileged mode are taken according to the value of the XVSVMID.VMID register 140. In Case (3), when the XVSCR.MD register 150 holds zero, and SR.MD register has zero, modes of WMID=0 to 255 in the user mode are taken according to the value of the XVSVMID.VMID register 140.

The physical address management module (PAM) 110 is ranked as a resource access management module for managing accesses to hardware resources 120, 130 and 131 which CPUs 100, 102 and 103 can use. The physical address management module 110 accepts inputs of information obtained from the mode registers, which has been set, and receives inputs of information for the control of accesses to the hardware resources 120, 130 and 131 from CPUs. Then, the physical address management module 110 compares the input information concerned with the information set in the parameter entry register 111, by use of the check gate circuits (CHCGT) 113, 114 and 115, and controls whether to grant or to deny accesses to the hardware resources 120, 130 and 131 in response to the access control information.

A software program (virtual machine manager program) which controls architecture resources in CPUs and the physical address management module 110 is run in the virtual machine manager mode (XVS Mode), thereby controlling the assignment of resources typified by the memory 120 and the I/O circuits 130 and 131 to the operating systems, individually bringing CPUs into action as independent working domains (virtual machines) in the modes with VMID=0 to 255, and further performing control for shutting off the influence of an inappropriate or invalid action by an operating system or a user program. A software program which assigns memory and I/O resources to the operating systems and performs the control for shutting off the influence of an inappropriate action by the operating system or the program when it is run in the virtual machine manager mode (XVS Mode) is hereinafter referred to as "virtual machine manager program", and a function materialized when CPU runs the program is referred to as "virtual machine manager.

FIG. 2 shows examples of main registers for action control in CPU. For instance, of register resources of CPU accessible only in the virtual machine manager mode (XVS Mode), registers directly connected with control of actions of CPU hardware are shown. The XVSCR register is a 32-bit register, which has a 2-bit portion ranging from 17th to 16th bit inclusive as a field named PIDSEL, a 0th-bit portion as a field named MD, and other bit portions unused. The XVSVMID register has a 8-bit portion ranging from 7th to 0th bit inclusive as a VMID field, and other bit portions unused. The XVR register has an XVR field constituted by the whole of thirty-two bits ranging from 31th to 0th bit inclusive. The XVSEVT register has a 12-bit portion ranging from 11th to 0th bit inclusive as a CODE field, and other bit portions unused. The SR register has a 0th-bit portion as an MD field.

Sometimes herein, a bit field portion having a bit width, a part of a register is represented in a format of [register name].[bit field name], and the portion per se is referred to as a register. Therefore, the above-described XVSCR.MD register is a name following this naming rule, which represents an MD field of the XVSCR register in fact.

Figure 3:
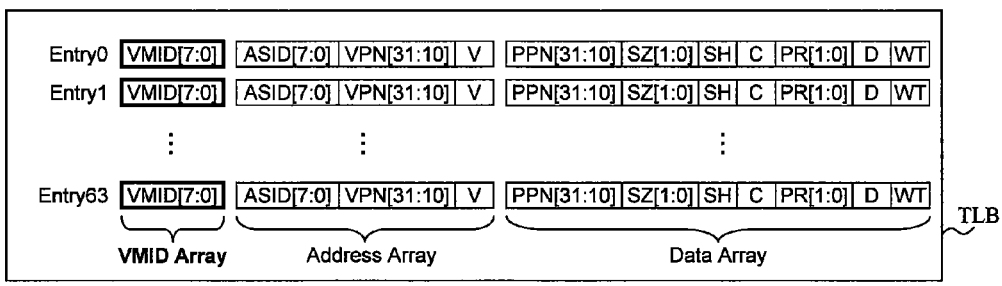
FIG. 3 is an illustration of assistance in explaining a TLB entry with a VMID field and a CPU authority field added thereto.

FIG. 3 shows the configuration of a translation look-aside buffer (TLB) constituting MMU 105. The translation look-aside buffer (TLB) holds address translation settings for translating a virtual address, which is an address for access issued by the execution section (EXEC), into a physical address. The translation look-aside buffer (TLB) has entries (Entry) composed of fields holding information pieces including an address translation pair and an authority of access for the address range. As to this example, the case where the TLB contains 64 sets of entries numbered 0 through 63 will be described. For instance, each entry is divided into three portions, which are referred to as "address array (AddressArray)", "data array (DataArray)", and "VMIDarray (VMIDArray)". The translation look-aside buffer (TLB) has a feature that the VMID array includes a VMID field of eight bits. In the VMID field is stored a VMID (virtual machine identifier) corresponding to an address translation pair. An address space ID managed by MMU is stored in an ASID field. A VPN field has a corresponding virtual page number stored therein. In a PPN field is stored a corresponding physical page number. Further, in an SZ field is stored a page size information. In a V field, a valid bit showing the validity of the entry is stored. Herein, SH denotes a shared flag, C denotes a cacheable flag, PR denotes a protect flag, D denotes a dirty flag, and WT denotes a write-through flag.

In address translation by MMU 105, hit judgments with respect to a virtual address generated by an executed instruction, a value of the XVSVMID.VMID register described above, and a value of an address space identifier (ASID) set by MMU 105 are performed for each entry using the VMID field, the VPN field, ASID field, and V field of an address array and the SZ field of a data array of the translation look-aside buffer (TLB). When a hit is found for any entry, the address value is replaced with the value of PPN field in the data array of the hit entry thereby to perform the translation into a physical address. Specifically, an entry is judged as being hit when all the following requirements are satisfied. The first requirement is that the virtual address generated by an executed instruction is included in an address range depending on the values of VPN field and SZ fields. The second requirement is that the value of the XVSVMID.VMID register agrees with the value of the VMID field. The third requirement is that the value of the ASID register set by MMU 105 coincides with the value of the ASID field of the translation look-aside buffer (TLB). The fourth requirement is that the value of the V field is one.

FIG. 4 shows an algorithm of authority-of-access judgment that MMU 105 carries out. Especially, in the authority-of-access judgment performed by MMU 105, the values of the XVSCR.MD register and SR.MD register, and the values of the PR field and D field of the translation look-aside buffer (TLB) at the time of executing an instruction which leads to the issue of an access influence the judgment. The value of the PR field is constituted by two bits; 00 means grant only for read in the privileged mode, 01 means grant for read and write in the privileged mode, 10 means grant only for read in the user and privileged mode, and 11 means grant for read and write in the user and privileged mode. Also, the D field represents whether write to the address range of an entry in question is performed or not. As a result of the judgment, access is granted or denied. At the time of the denying, an exceptional treatment request according to the reason for the denying is created.

The types of the exceptional treatment request created when access is denied include: a protection error exception (Protection Error Exception); and an initial page write exception (Initial Write Exception). The protection error exception is an exception which occurs when an actual access by a specified access right is not granted even though there is address translation information matching a virtual address with which access was made. The initial page write exception is an exception which occurs even though there is address translation information matching a virtual address with which data access was made (data was written) and an access right has been given.

First at Step 401, MMU 105 uses the values of the XVSCR.MD register and SR.MD register to make a judgment according to the authority-of-access judgment algorithm. In the user mode, the algorithm branches as denoted by the reference numeral 402. In the privileged mode or virtual machine manager mode (XVS Mode), the algorithm branches as denoted by the reference numeral 403. In the user mode, at Step 411 after the branching denoted by 402, a judgment is made using the value of the PR field. In the case of the PR field having a value of 00 or 01, i.e. an address region that only an access in the privileged mode is granted, the algorithm branches as denoted by the reference numeral 412, and it is judged that a protection error exception occurs. In the case of the PR field having a value of 10, i.e. an address region that only a read in the user and privileged mode is granted, the algorithm branches as denoted by the reference numeral 413. In the case of the PR field having a value of 11, i.e. an address region that read and write in the user and privileged mode are granted, the algorithm branches as denoted by the reference numeral 414. At Step 421 after the branching denoted by 413, a judgment is made on whether the access is for read or not. In the case of access for read, the algorithm branches as denoted by the reference numeral 422, and the access is judged to be granted. If not, i.e. in the case of access for write, the algorithm branches as denoted by the reference numeral 423, and it is judged that a protection error exception occurs. Also, at Step 431 after the branching denoted by 414, a judgment is made on whether the access is for read or not. In the case of access for read, the algorithm branches as denoted by the reference numeral 432, and the access is judged to be granted. In the case of access for write, the algorithm branches as denoted by the reference numeral 433. At Step 441 after the branching denoted by 433, a judgment is made using the value of the D field. When the D field has a value of zero, the algorithm branches as denoted by the reference numeral 442, and it is judged that an initial page write exception occurs. When the D field has a value of one, the algorithm branches as denoted by the reference numeral 443, and the access is judged to be granted. At Step 451 after the branching denoted by 403, a judgment is made using the value of the PR field as at Step 411. In the case of the PR field having a value of 00 or 10, i.e. an address region that only a read is granted, the algorithm branches as denoted by the reference numeral 452. In the case of the PR field having a value of 01 or 11, i.e. an address region that read and write are granted, the algorithm branches as denoted by the reference numeral 453. At Step 461 and 471 after the branching denoted by 452 and 453 respectively, judgments are made on whether the access is for read or not. In the cases of access for read, the algorithm branches as denoted by the reference numerals 462 and 472 respectively. In the cases of access for write, the algorithm branches as denoted by the reference numerals 463 and 473 respectively. Subsequently to the branching denoted by 462 and 472, the access is judged to be granted. Subsequently to the branching denoted by 463, it is judged that a protection error exception occurs. At Step 481 after the branching denoted by 473, a judgment is made using the value of the D field. In the case of the D field having a value of zero, the algorithm branches as denoted by the reference numeral 482, and it is judged that an initial page write exception occurs. In the case of the D field having a value of one, the algorithm branches as denoted by the reference numeral 483, and the access is judged to be granted.

MMU, which has been described with reference to FIGS. 3 and 4, has the following features. The first is that it is not required to provide translation look-aside buffers (TLB) respectively corresponding to the operating system environments composed of user modes and privileged modes with VMID=0 to 255 as described above. The second is that the system according to the invention can be materialized while the increase in the hardware scale is suppressed.

Figure 5:
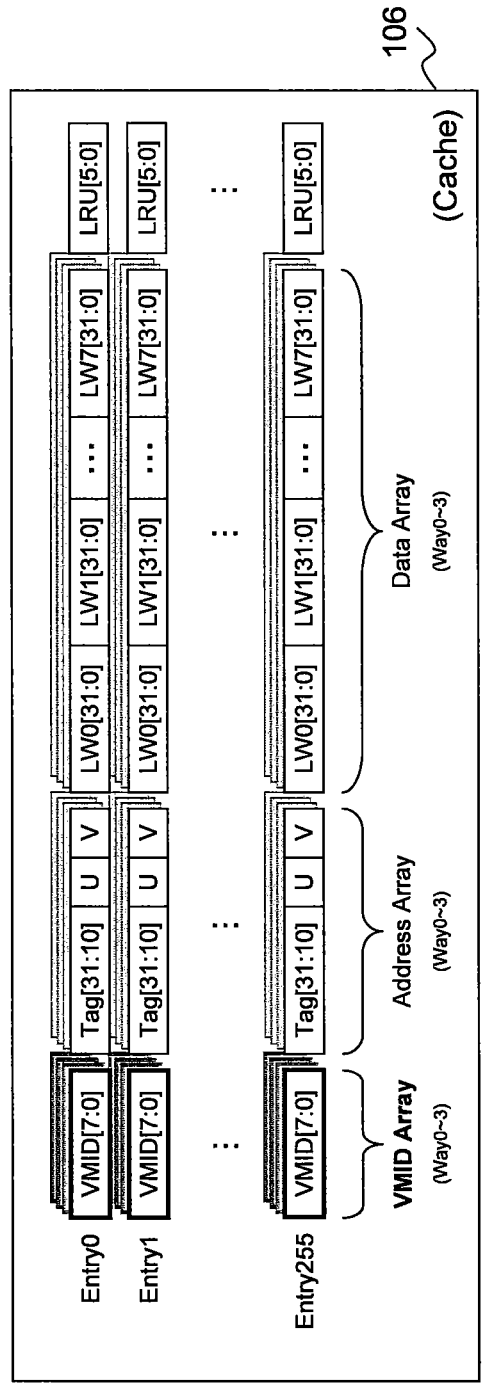
FIG. 5 is an illustration of assistance in explaining a cache entry with VMID field added.

FIG. 5 shows a configuration of the cache memory (Cache) 106. The cache memory (Cache) 106 includes a pair of cached data per se and the value of a physical address corresponding to the data. Here is taken an example of the configuration of a cache memory referred to as "set associative". A way includes pairs of data and physical addresses corresponding the data. An entry includes ways thus arranged. For instance, the cache memory has cache entries numbered 0 through 255 (Entry0 to Entry255); each entry includes ways numbered 0 to 3 (Way0 to Way3). One entry is divided into an address array (Address Array), a data array (Data Array) and a VMID array (VMID Array), on a large scale. The address array includes a Tag field, a U field and V field. In the data array is saved corresponding address data of the memory (MEM) 120 shown in FIG. 1, and the state of the data is also stored. The Tag field holds high-order bits of the address. In the U field is stored whether data in the LW0 to LW7 fields of Data Array are the same as the data in the memory (MEM) 120, or otherwise data in the LW0 to LW7 fields of Data Array are up-to-date. In the V field is stored whether an entry in question is valid data or not. Data Array includes LW0 to LW7 fields; in the LW0 to LW7 fields are stored contents of data of the memory (MEM) shown in FIG. 1. In the VMID field is stored the value of the XVSVMID.VMID register at the time when data copy from the memory (MEM) 120 of FIG. 1 to the LW0 to LW7 fields of Data Array is performed.

Figure 6:
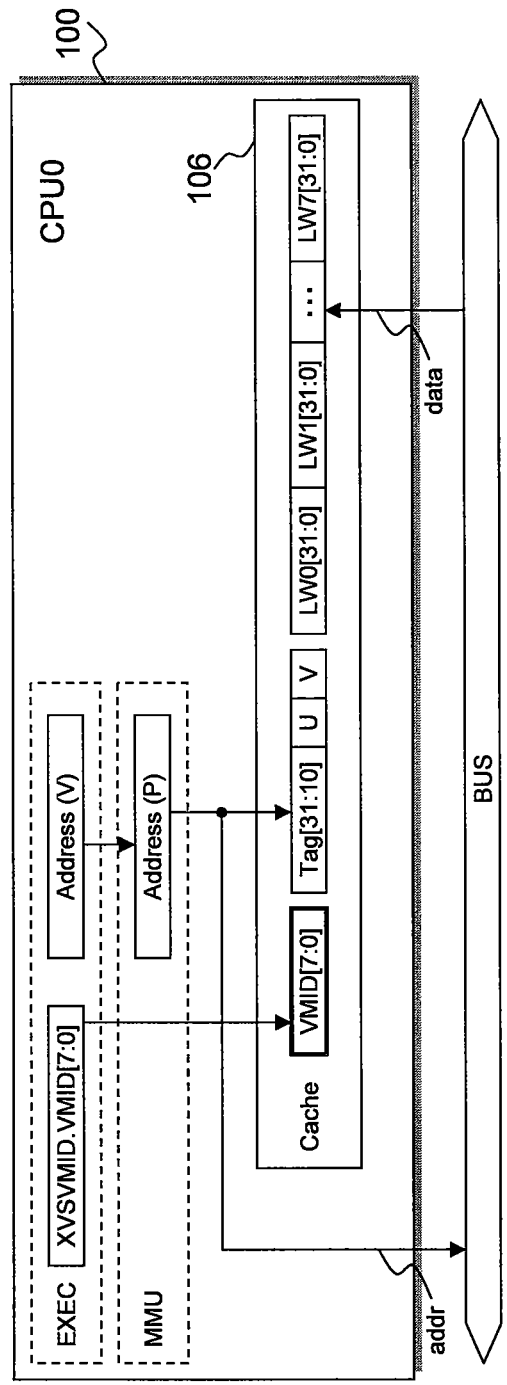
FIG. 6 is a flow chart showing an example of an update algorithm of a cache entry VMID field.

FIG. 6 shows data flows to the cache memory 106 and the internal bus BUS when no hit is found in the hit judgment on the cache memory 106. In the case of no cache hit, the content corresponding to the physical address (Address (P)) is read through the internal bus BUS, the physical address at that time is stored in the Tag field of the corresponding way, and the data thus read out are stored in the LW0 to LW7 fields. In parallel, CPU stores an XVSVMID.VMID register value in the VMID field.

Figure 7:
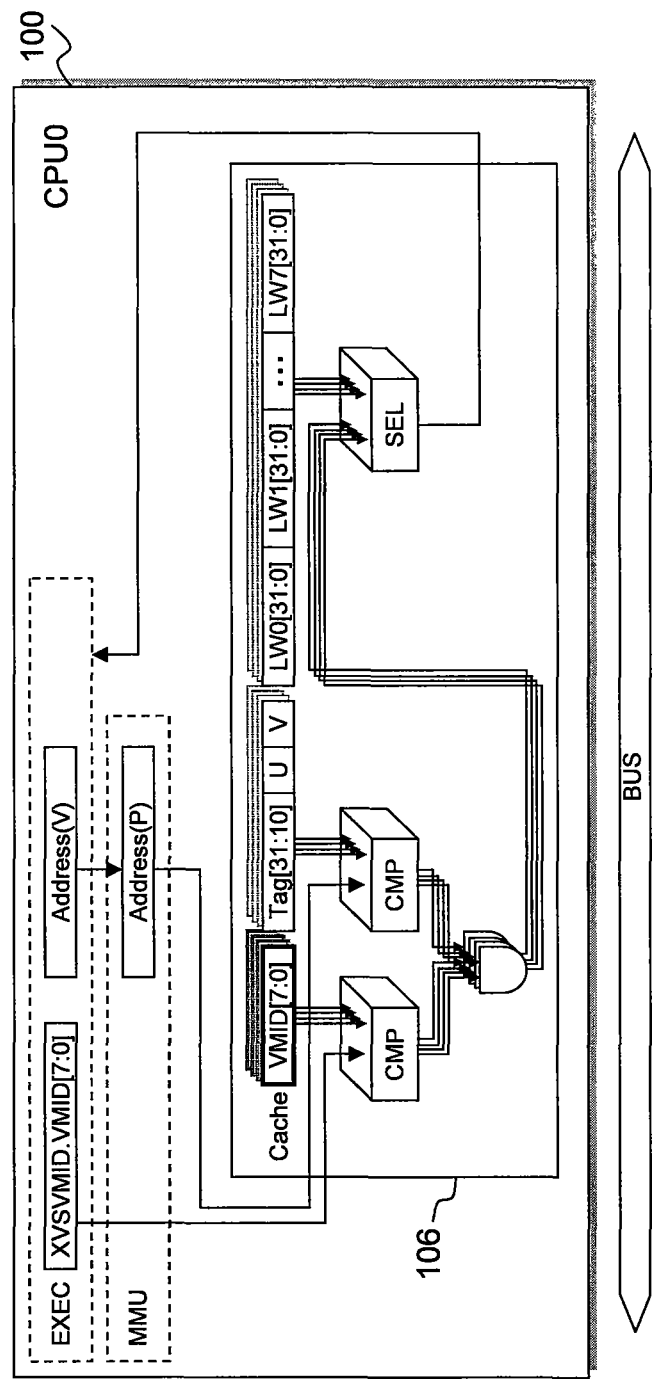
FIG. 7 is a flow chart showing a hit judgment algorithm by the cache entry VMID field.

FIG. 7 shows a hit judgment action for the cache memory 106 in CPU. The hit judgment for the cache memory 106 is performed by comparing the physical address translated by the memory management unit 105 and the XVSVMID- .VMID register value with contents stored in the Tag field and V field of Address Array of the cache memory 106 and in the VMID field of VMID Array when a logic address is output from the execution section 104 as a result of the execution of an instruction. Especially in the set associative method, targets for the comparisons are all the ways included in the entry indexed by a portion of low-order bits of a virtual address generated by the executed instruction. When a way is hit, data stored in LW0 to LW7 of Data Array of the relevant way are read out.

The cache memory 106 as described above eliminates the need for providing cache memories corresponding to VMID=0 to 255 respectively, and therefore it can suppress the increase in the hardware scale.

FIG. 8 is a table for showing a method for producing a pid signal (pid) in CPU. The pid signal is a signal of eight bits showing from which operating system in CPU a bus access comes. The output mode of the pid signal depends on the value of the XVSCR.PIDSEL resister as described above, which is VMID8 mode, VMID4+ASID4 mode, or ASID8 mode.

(1) VMID8 Mode

The value of the XVSVMID.VMID register at the time of execution of an instruction causing a bus access is output for the pid signal.

(2) VMID4+ASID4 Mode

The values of low-order four bits of the XVSVMID.VMID register at the time of execution of the instruction are output for high-order four bits of the pid signal, and the values of high-order four bits of the ASID register of the hit TLB entry are output for low-order four bits of the pid signal. In this case, it is assumed that CPU conducts data processing within a range of VMID=0 to 16.

(3) ASID8 Mode

The value of the ASID register of the hit TLB entry is output for the pid signal. In this case, it is assumed that CPU performs data processing only with VMID=0.

The pid signal is input through the internal bus BUS to the physical address management module (PAM) 110, which is to be described later. The PAM module 110 is located between the internal bus BUS and the memory 120 and I/O circuits (I/O devices) 130 and 131. The PAM module 110 uses the check gate circuits (CHCGT) 113, 114 and 115 to compare the value of a signal such as the pid signal with a parameter entry (PAMENTRY) that the parameter entry register 111 holds. Also, the PAM module 110 checks the authority of access from CPU through the internal bus BUS, and adds an offset to an address. The reason why the physical address management module (PAM) 110 lies between the internal bus BUS, and the memory 120 and I/O devices 130 and 131 is to enable accesses from CPUs and other bus master devices to be checked at one place.

FIG. 9 shows the configuration of each entry of the parameter entry register (setting register table) 111 which the physical address management module (PAM) 110 has. One entry is constituted by sixteen bytes, and has a plurality of fields. According to the values of the table 111, a bus access other than an access for write into the setting register table 111, i.e. an access to a connected bus slave device is granted or denied, and further addition of an offset to an address is performed.

In the ADDR field and AMSK field are held values used for hit judgment of an address signal (addr) input through the bus. Address information for specifying an address region targeted for access is set into the ADDR field. The SRC field and SMSK field hold values used for hit judgment of a source ID signal (src) input through the bus. In the SRC field is stored an identification code for identifying a bus master device such as CPU which makes an access subject. The source ID signal shows from which bus master device a bus access comes. The PID field and PMSK field hold values used for hit judgment of the pid signal input through the bus. The pid signal is output by CPU as described above. In the PID field is stored PID information to be compared with the pid signal. The PID information is data which conforms to the definition of the pid signal as described with reference to FIG. 8. The OFFSET field keeps an offset value to be added to the value of an address signal when a bus access is granted. The offset is, for instance, a piece of address offset information to a memory region specific to a virtual machine specified by VMID with respect to the head address of the memory 120. In the PR field is stored read protect information showing whether a read bus access is granted or not. In the PW field, write protect information showing a write bus access is granted or not is stored. An entry of the setting register table 111 may be provided for each VMID of a bus master, for instance.

FIG. 10 is a flow chart showing an algorithm for checking the authority of accesses to the bus slave devices 120, 130 and 131. The virtual machine manager 190 performs table setting for the parameter entry register (setting register table) 111 of the physical address management module (PAM) 110. The physical address management module (PAM) 110 executes processing, for example, according to the hardware logic thereof as shown in FIG. 10

In the first judgment, an address signal (addr) on the bus is judged at Step 1000. AND operation of the value of the address signal (addr) and the AMSK field is carried out. If the resultant value does not coincide with the value of the ADDR field, the access is denied (Step 1006). In the second judgment, the source ID signal (src) on the bus is judged at Step 1001. AND operation of the value of the source ID signal (src) and the value of the SMSK field expanded to the bit width of the source ID signal is carried out. Then, if the resultant value does not agree with the value of the SRC field, the access is denied (Step 1006). In the third judgment, a pid signal (pid) is judged at Step 1002. AND operation of the value of the pid signal (pid) and the value of the PMSK field expanded to the bit width of the pid signal is carried out. Then, if the resultant value does not agree with the value of the PID field, the access is denied (Step 1006). In the last judgment, a judgment according to the type of bus access is made. In the case where the access is judged at Step 1003 to be a read access, if the PR field value is not one at Step 1004, the access is denied (Step 1006). In the case where the access is judged at Step 1003 to be a write access, if the PW field value is not one at Step 1005, the access is denied (Step 1006). The setting register table 111 of the physical address management module (PAM) 110 contains a plurality of entries actually, and therefore the judgments as shown in the drawing are performed for the individual entries. If at least one entry is judged as access granted, the access is judged to be granted (Step 1007).

Figure 11:
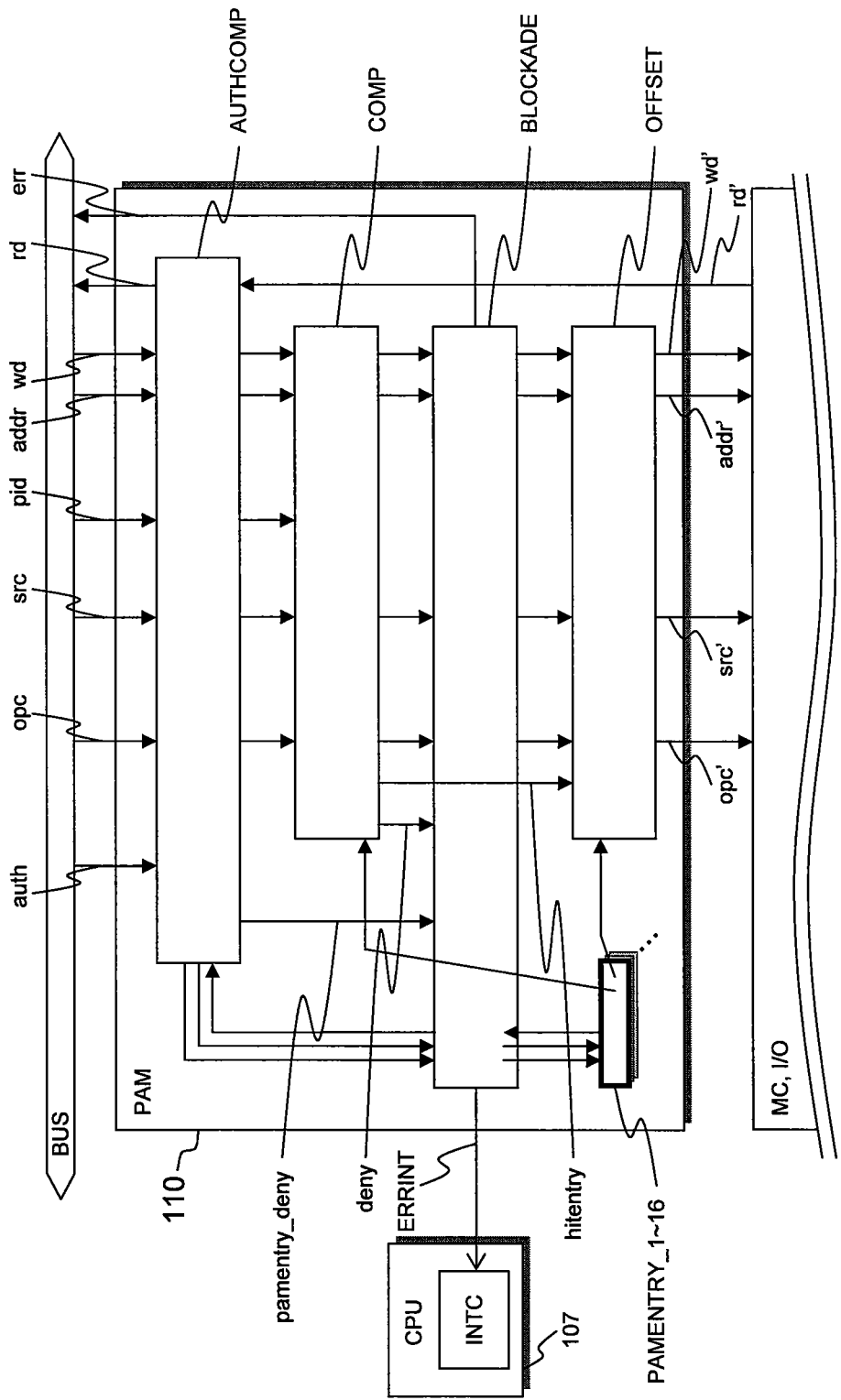
FIG. 11 is a block diagram of PAM.
Figure 12:
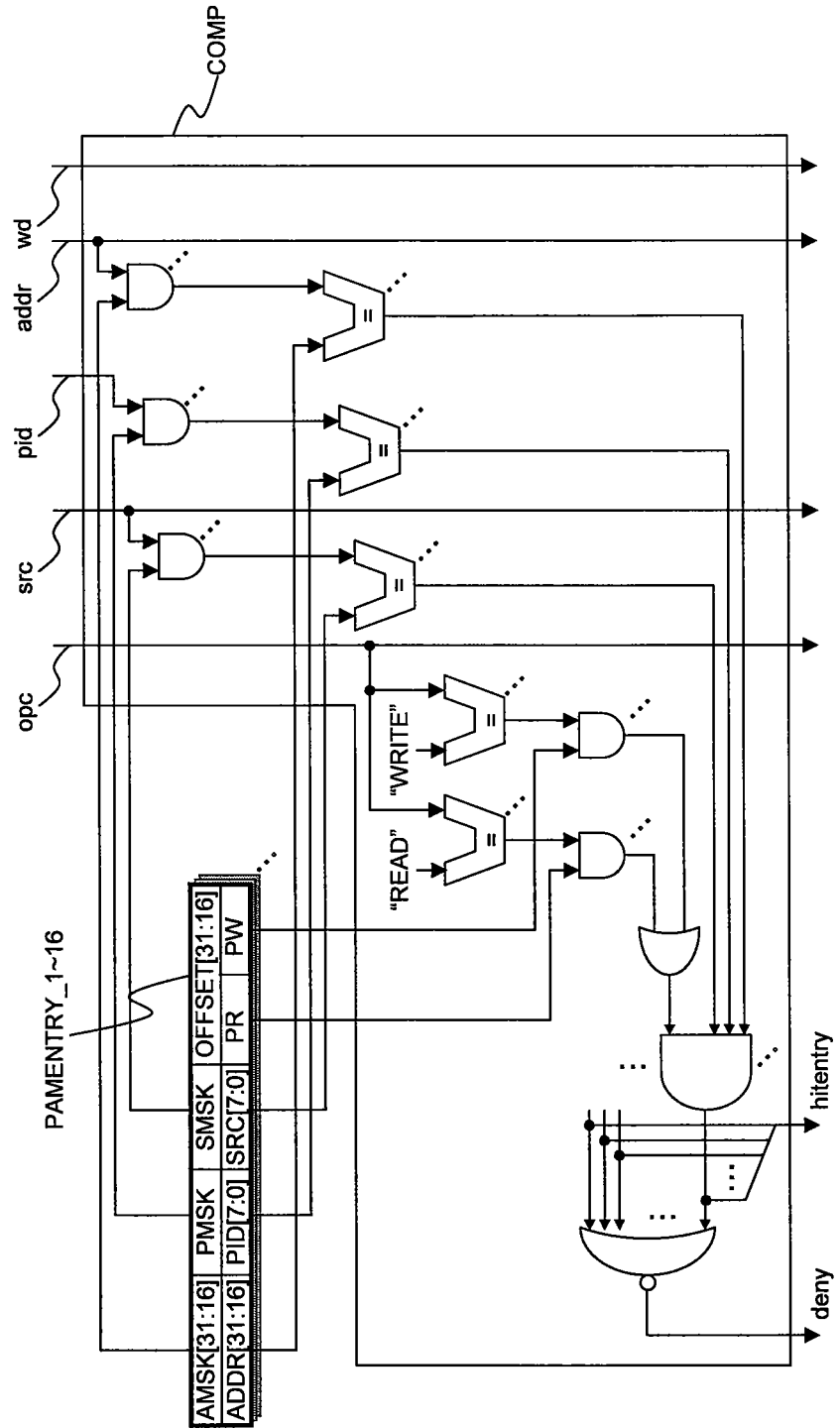
FIG. 12 is a logic circuit diagram of a comparator circuit COMP incorporated in PAM.
Figure 13:
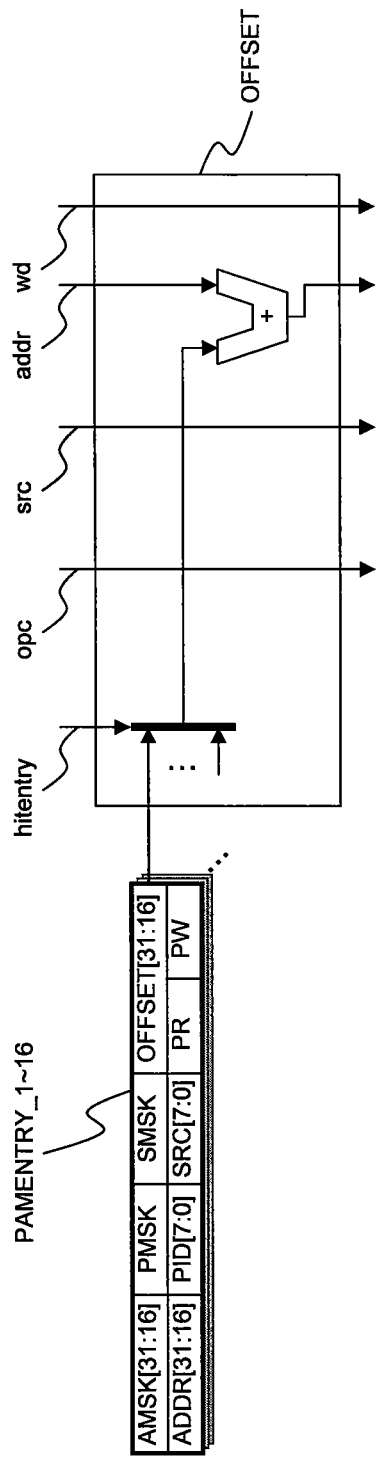
FIG. 13 is a logic circuit diagram of an offset-adder circuit OFFSET incorporated in PAM.

FIG. 11 shows an example of the whole configuration of the physical address management module 110. FIG. 12 shows an example of a comparator circuit COMP that the physical address management module 110 includes. FIG. 13 shows an example of an offset-adder circuit OFFSET that the physical address management module 110 includes.

Signals between the physical address management module 110 and the internal bus BUS include, as signals input to the physical address management module 110 from the internal bus BUS, an authority-of-access signal (auth), an access type signal (opc), a source ID signal (src), a pid signal (pid), an address signal (addr) and a write data signal (wd). Especially, the authority-of-access signal (auth) results from the output of the values of the XVSCR.MD register and SR.MD register at the time of execution of an instruction causing a bus access in CPU. Also, there are a read data signal (rd) and an authority-of-access error notice signal (err) as signals output from the physical address management module (PAM) to the LSI internal bus. As a signal between the physical address management module 110 and interrupt controller (INTC) 107, there is an authority-of-access error interrupt notice signal ERRINT. Signals between the physical address management module 110 and the bus slave devices including the memory 120 and I/O devices 130 and 131 include an access type signal (opc'), a source ID signal (src'), an address signal (addr') and a write data signal (wd'), which the physical address management module 110 outputs, and a read data signal (rd'), which the bus slave device outputs. In the physical address management module 110, the forementioned setting entry table 111 shown in FIG. 9 has e.g. parameter entries PAMENTRY_1-16, which represents sixteen entries. Signals input through the internal bus BUS are entered into the comparator circuit AUTHCOMP in the physical address management module 110.

The comparator circuit AUTHCOMP allocates accesses according to the address signal and the authority-of-access signal. Specifically, the comparator circuit apportions an access to PAMENTRY_1-16 when the access destination is the setting entry table of the physical address management module 110, and directs an access to the comparator circuit COMP of the subsequent stage in the case of a typical access other than the above-described case. Also, the comparator circuit checks the authority-of-access signal and sends the block circuit BLOCKADE a piece of information on whether the accesses to PAMENTRY_1-16 come from a program running in the virtual machine manager mode (XVS Mode) or not. The comparator circuit COMP makes a judgment of the authority of a typical bus access other than accesses to PAMENTRY_1 TO 16. The comparator circuit masks contents of the address signal, access type signal, source ID signal and pid signal entered from the comparator circuit AUTHCOMP and compares on their coincidence according to the contents of the setting entry table of the physical address management module 110, and outputs the result as a deny signal to the block circuit BLOCKADE. Also, the comparator circuit outputs the individual signals entered from the comparator circuit AUTHCOMP to the block circuit BLOCKADE. The block circuit BLOCKADE uses the comparison result values produced by the comparator circuits AUTHCOMP and COMP selectively blocks accesses to PAMENTRY_1-16 and typical buss accesses. Of the accesses to PAMENTRY_1-16, an access is blocked if it is not an access from a program running in the virtual machine manager mode (XVS Mode). Of typical bus accesses, an access is blocked when there is not an entry which is made Access Granted, as described above. When the block circuit BLOCKADE blocks a bus access, the internal bus BUS and the interrupt controller 107 are notified of the fact by means of an error signal and an ERRINT signal, respectively. Where the err signal and ERRINT signal are supplied to is controlled according to the pid signal input at that time. For a typical bus access which has not been blocked by the block circuit BLOCKADE, the offset-adder circuit OFFSET adds an offset to the value of the address signal thereof. The offset-adder circuit accepts, as a hit entry signal, an entry judged as being Access Granted one, executes an add operation to an OFFSET field value of the entry, and outputs the resultant signal to the bus target device. The check gates 114 and 115 in the FIG. 1 are composed of the comparator circuit COMP and the offset-adder circuit OFFSET. The check gate 113 includes the comparator circuit AUTHCOMP and the block circuit BLOCKADE. Incidentally, the processing described with reference to FIG. 10 is performed by the comparator circuit COMP.

According to the method shown with reference to FIGS. 8 to 11, the authority-of-access check and address offset are performed on the memory 120 and I/O devices 130 and 131. The parameter entries PAMENTRY_1-16 are arranged so as to be set only by the virtual machine manager 190. In addition, a circuit for addition of an Access Granted-judging parameter to a bus access and an OFFSET circuit for a bus access are introduced. Thus, the virtual machine manager 190 performs the appropriate hardware control on the physical address management module 110, whereby the resources such as the memory 120 and I/O devices 130 and 131 can be allocated to and cut off from the operating system environments consisting of user and privileged modes with VMID=0 to 255 as described above.

FIG. 14 shows examples of types of interrupts and exceptions and destination-of-transition addresses at the time of their occurrence in CPU. While interrupts and exceptions are herein distinguished from each other in descriptions in the DETAILED DESCRIPTION OF THE PREFERRED EMBODIMENTS, an interrupt stated in other portions hereof shall include an exception conceptually. The column titled "Exception" denoted by the reference numeral 1400 shows the type of exception which can occur in CPU. The column titled "Vector Address (w/XVS support)" denoted by the reference numeral 1410 shows a destination-of-transition address in CPU. Conventionally, when an exception or interrupt occurs, an transition to an address stored in a reset vector or a register termed VBR is caused. However, a transition to an address stored in the above-described XVR register is performed in CPU according to the embodiment. Further, an interrupt and exception are handled by an operating system program staying at its destination of transition after execution of the transition by the hardware in general. However, according to the embodiment, transition to the value of the XVR register, which is prepared in addition to the VBR register used by the operating system, is enabled in CPU, and therefore the virtual machine manager 190 can handle it appropriately.

Figure 15:
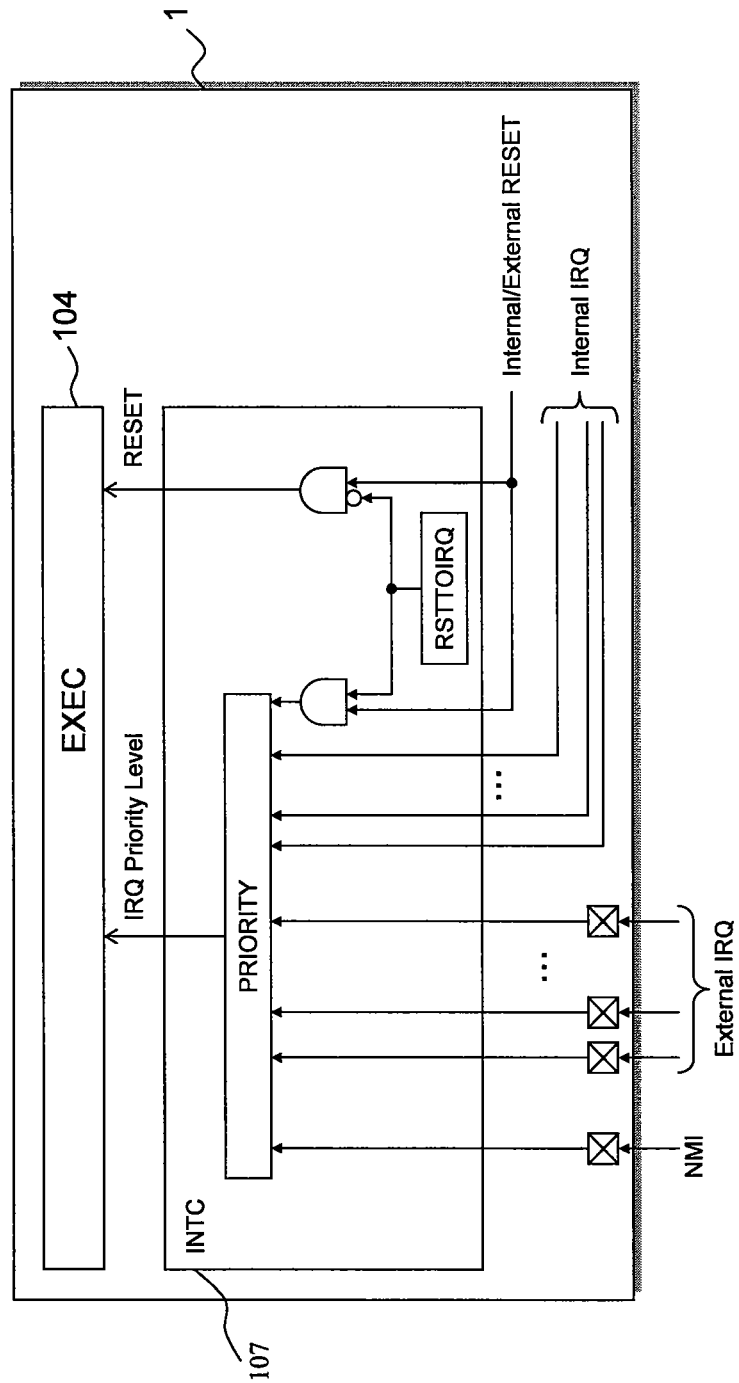
FIG. 15 is a block diagram of an interrupt controller to cope with interrupt allotment and reset signal interruption.

FIG. 15 shows an example of the interrupt controller (INTC) 107. The interrupt controller 107 uses a priority control section PRIORITY to judge priorities of a non-maskable interrupt (NMI) and an external interrupt request (External IRQ), which are input through an external terminal of the microprocessor 1, and the priority of an internal interrupt request (Internal IRQ) which is input from the inside of the microprocessor. Then, the interrupt controller 107 notifies the execution section (EXEC) 104 of the request level (IRQ Priority Level) of a request having the highest priority. The interrupt controller 107 has a register RSTTOIRQ therein. When an internal reset signal or external reset signal (Internal/External RESET) is input, the interrupt controller 107 controls activation/deactivation of the reset signal to the corresponding execution section 104 according to the value of the register RSTTOIRQ. When the value of the register RSTTOIRQ is zero (0), the internal reset signal and external reset signal are all output as reset signals RESET for the execution section 104 as they are. In short, the whole microprocessor 1 is reset. When the value of the register RSTTOIRQ is one (1), the internal reset signal and external reset signal are handled as an interrupt signal, and only the corresponding execution section 104 can be reset.

Thus, it becomes possible to use the virtual machine manager 190 to control reset requests by means of the internal reset signal and external reset signal, and therefore it becomes possible to deal with the reset requests as a reset for a certain operating system environment.

Now, referring to FIGS. 18 to 32, the configuration of the microprocessor 1 will be described from the viewpoint of software. As the function of the software is materialized by controlling hardware, the description will be presented particularly focusing on the virtual machine manager program.

Figure 18:
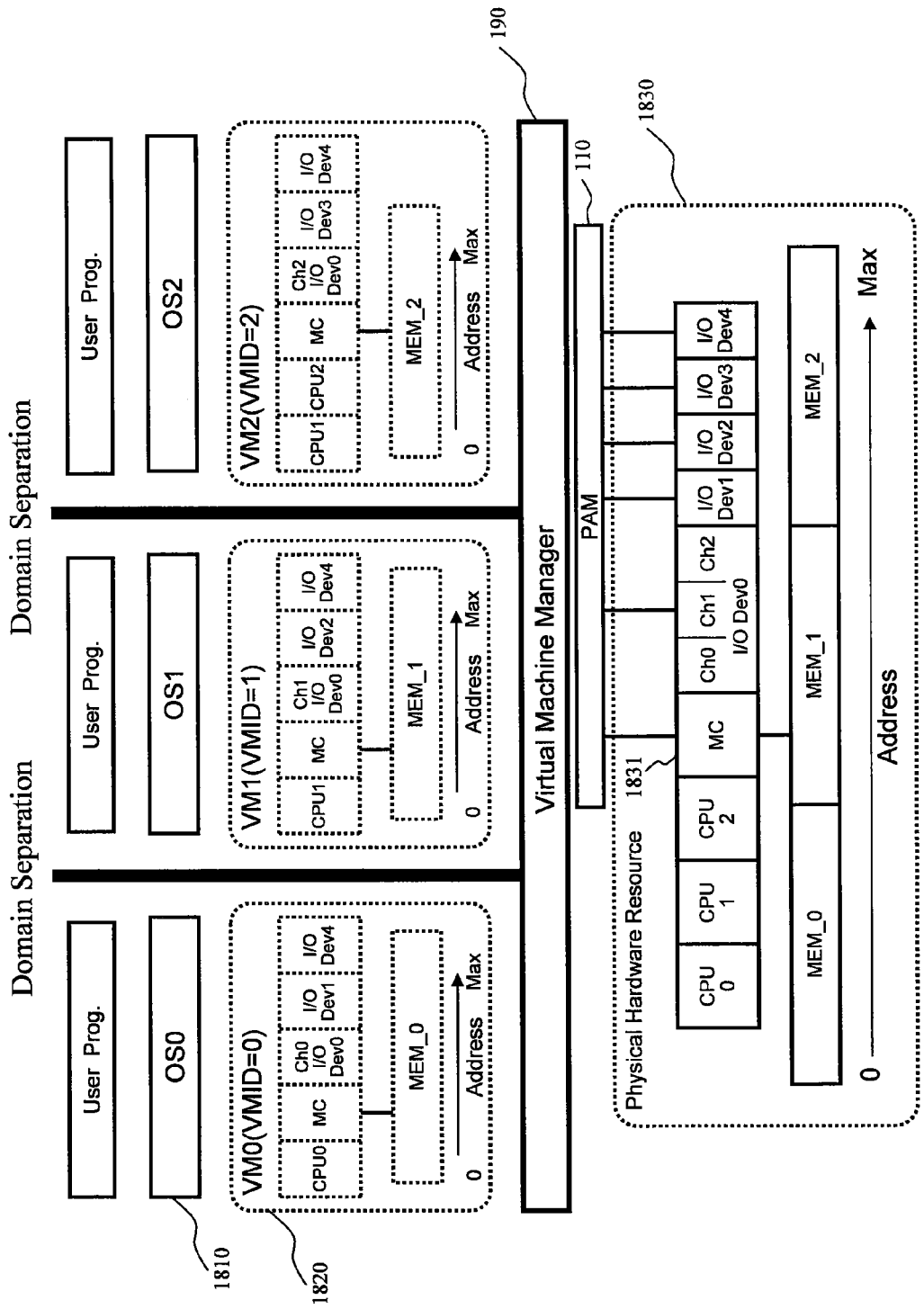
FIG. 18 is an illustration of assistance in explaining a function of a microprocessor, focusing on the functions (memory, I/O division, CPU sharing) of a virtual machine manager.

FIG. 18 shows an example where the virtual machine manager 190 assigns CPUs and a hardware resource including a memory 120 and I/O devices 130 and 131 to operating systems. Such physical hardware resource refers to a hardware unit 1830 which LSI includes actually. Here, CPUs are denoted by the reference characters CPU0 to CPU2, and therefore a total of three CPUs are connected. The memory (MEM) 120 with successive addresses is connected through the physical address management module (PAM) 110 to one memory controller (MC) 1831. The hardware unit includes e.g. an I/O Dev0 having a plurality of channels (Ch0 to Ch2) as an I/O resource, and I/O devices Dev1 to Dev4, each having a single channel, and is connected through the physical address management module (PAM) 110. The virtual machine manager 190 assigns, as virtual hardware resources, the physical hardware resources as described above to operating systems, and enables the individual operating systems to use the assigned hardware resources exclusively. Here, the virtual machine manager 190 assigns the resources as virtual machines VM0 to VM2 to the three operating systems OS0 to OS2 respectively. VM0 is a virtual machine with VMID=0. VM1 is a virtual machine with VMID=1. VM2 is a virtual machine with VMID=2. In FIG. 1, what corresponds to a pair of a user program (User Prog.) and an operating system for one VMID makes a virtual machine (VM).

FIG. 19 shows an example of a VM definition file for setting assignment of the hardware resources by the virtual machine manager. The assignment of CPUs is determined by "CPU:" field in the VM definition file as shown in FIG. 19. The microprocessor may read the VM definition file each time of power-on reset, and assign the hardware resources on an as-needed basis according to the definition file. However, the hardware resources have been assigned according to the VM definition file on the design stage of the microprocessor 1 here. Therefore, the assignment of hardware resources is fixed in CPUs manufactured in the microprocessor 1. In the example of FIG. 19, CPU0 is assigned to VM0, CPU1 is assigned to VM1, and CPU1 and CPU2 are assigned to VM2. The assignment like this is based on the following assumption. That is, OS0 and OS1 are each an operating system which works on a single central processing unit (CPU), and OS2 is an operating system which supports the symmetric multiprocessor system and works on a plurality of CPUs. Now, it is noted that in regard to the assignment of CPUs, two types of assignment forms are specified implicitly in the above-described setting. The assignment forms are a one-to-one allocation form and a one-to-n allocation form. The one-to-one allocation form represents, for example, the assignment of CPU0 to VM0. CPU0 is not assigned to any other virtual machine (VM), and VM0 can use CPU0 without sharing CPU0 with other virtual machine (VM). Therefore, the virtual machine manager 190 has only to initiate OS0 on CPU0 at the time of activating the microprocessor 1. In contrast, the one-to-n allocation form corresponds to the assignment of CPU1 to VM1 and VM2. In this case, the virtual machine manager has OS1 and OS2 working on CPU1 while switching OS1 and OS2 according to a method such as time-division control during the time when the microprocessor 1 is in operation. It is desirable that this control is executed by use of an independently-working domain management hardware mechanism.

The assignment of the memory 120 depends on "PMem_Start:" field, "PMem_Size:" field, and "VMem_Start:" field in the VM definition file shown in FIG. 19. "PMem_Start:" and "PMem_Size:" fields define the address region of the memory, which exists as a physical hardware resource and is assigned to a virtual machine (VM). "VMem_Start:" field defines the address region on the virtual machine (VM) which the assigned memory is located in. In this embodiment, VM0 is assigned a memory region of 64 Mbytes of the size 0x04000000 from the physical memory address 0x00000000, i.e. a memory region ranging from the address 0x00000000 to 0x03FFFFFF. Also, this memory region can be accessed from VM0 with the addresses ranging between 0x00000000 to 0x03FFFFFF. VM1 is assigned a memory region of 64 Mbytes ranging from the address 0x0400000 to 0x07FFFFFF. This memory region can be accessed from VM1 with the addresses ranging 0x00000000 to 0x03FFFFFF under the control of the virtual machine manager 190. VM2 is assigned a memory region of 128 MBytes ranging from the address 0x08000000 to 0x0FFFFFFF. This memory region can be accessed from VM2 with the addresses 0x00000000 to 0x07FFFFFFF. Now, for the memory assignment method, note not only the point that the method serves to assign an address region of the memory as a physical hardware resource, but also the point that the place on the virtual machine (VM), where the address region is located, can be set. The reason why the arrangement like this is made is as follows. That is, an operating system is designed in the condition where the start address of a memory address region to be used is fixed, and therefore to change the start address, it can be required to modify the operating system per se. If an address region on a virtual machine (VM) cannot be made variable, it would be impossible to have a plurality of operating systems working without modifying the operating systems consequently. Meanwhile, for control of memory assignment as described above, it is desirable to use the above-described physical address management module (PAM) 110 to execute the control. The assignment of I/O devices (I/O) depends on "Exclusive I/O:" field, "Partitioned I/O:" field and "Shared I/O:" field in the VM definition file of FIG. 19. The I/O device specified by "Exclusive I/O:" field is exclusively assigned to the corresponding virtual machine (VM). The I/O device specified by "Partitioned I/O:" field is exclusively assigned to the corresponding virtual machine (VM) in channels defined by the I/O device. The I/O device specified by "Shared I/O:" field is allotted to a plurality of virtual machines (VM) so that it is shared by the plurality of virtual machines (VM). To allow a plurality of virtual machines (VM) to share an I/O device, it is necessary that the virtual machine manager 190 traps the accesses issued by the operating system to the plurality of virtual machines (VM) and performs an action for arbitration. For the trap, it is desirable to use the physical address management module (PAM) 110. The method for arbitration by the virtual machine manager 190 is to be described later.

The assignment of physical hardware resources by the virtual machine manager 190 has been described above. However, the virtual machine manager 190 not only assigns such resources, but also performs domain separation for blocking an operating system or a program, which is working on a certain virtual machine (VM), from accessing a physical hardware resource of other virtual machine (VM). It is desirable that such control is performed using the physical address management module (PAM) 110 as described above.

While methods for assignment of physical hardware resources and domain separation by the virtual machine manager 190 have been described above, a technique for having a virtual machine manager software per se and a plurality of operating systems coexisted will be described below. For the configuration as described above, it is desirable that the virtual machine manager program works in a newly added virtual machine manager mode (XVS Mode) for CPU.

Figure 20:
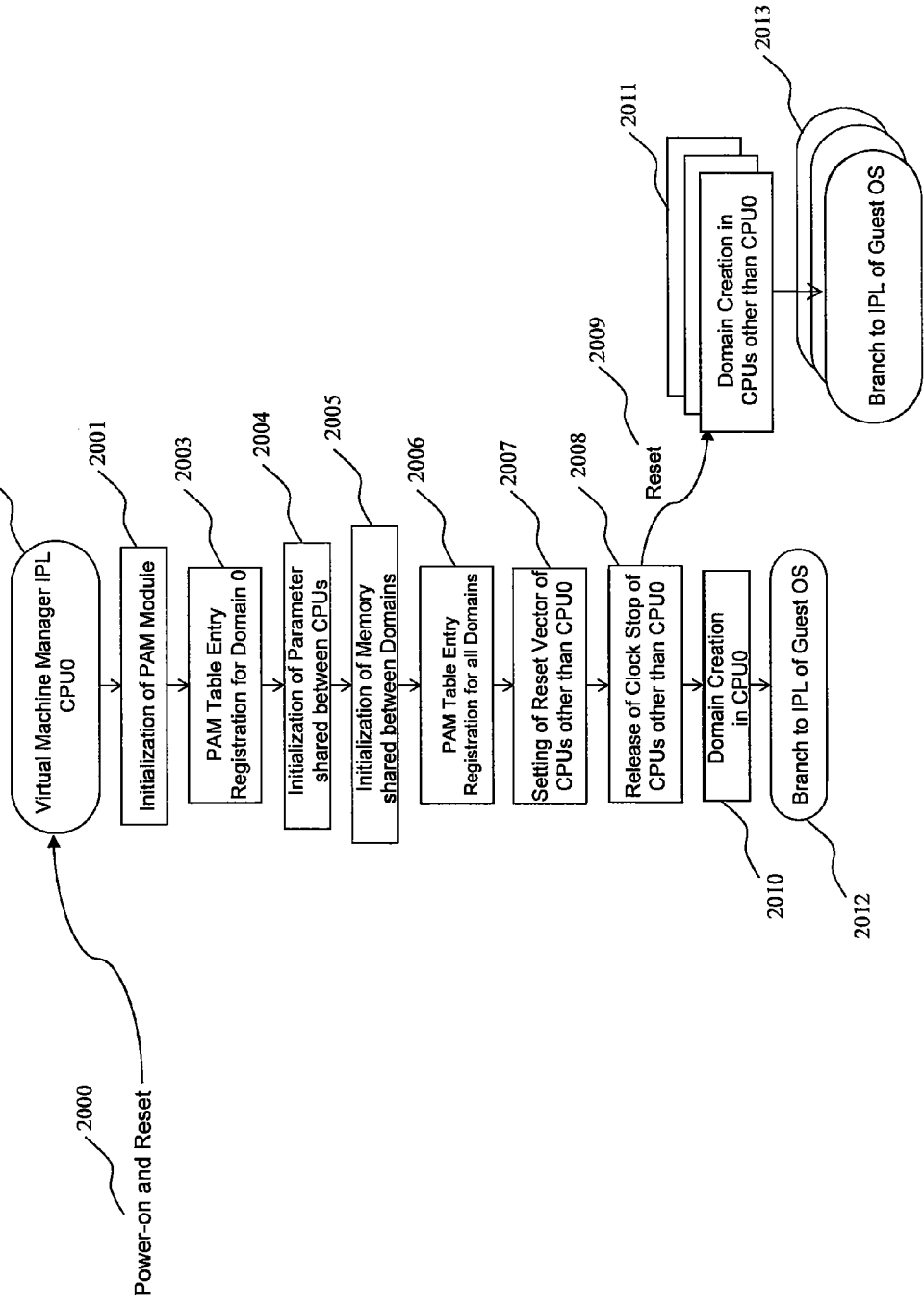
FIG. 20 is a flow chart clearly showing the relation of functional apportionments and calling at the time of starting the virtual machine manager.

The outline of actions of the virtual machine manager and the configuration of modules according to the invention will be described with reference to FIGS. 20 and 21. FIG. 20 shows, in the form of an action flow in startup of the microprocessor 1, a procedure when an initialization program included in the virtual machine manager program performs initialization. The startup is carried out by entering a power-on reset signal into a hardware unit (Step 2000), and then a reset is applied to the microprocessor 1 on the whole, whereby a typical reset process is performed. After that, execution of the virtual machine manager IPL (IPL: Initial Program Loader) is started (Step 2001), followed by initializing the system, starting the virtual machine manager program, and starting the respective operating systems according to the flow shown in FIG. 20. The flow in FIG. 20 will be described below in turn.

When the microprocessor is performed power-on reset, the control is transferred to IPL of the virtual machine manager of the particular CPU0. IPL loads its execution image into the memory from ROM (denoted by 121 in FIG. 1) and transfers the control to the entry. In this entry is contained a virtual machine manager initialization routine, by which initialization is performed. A series of processing is all executed on CPU0 (Step 2001) According to the virtual machine manager initialization routine, the following processes are executed: initialization of the physical address management module (PAM) 110 (Step 2002); registration of a table entry PAMENTRY of the physical address management module (PAM) 110 for a domain for CPU0 (Step 2003); initialization of a memory shared by domains (Steps 2004 and 2005); and registration of table entries of the physical address management module (PAM) 110 for all domains (Step 2006). At this point of time, the address translation mechanism of the physical address management module (PAM) 110 sets the memory 120 so that individual CPUs can occupy regions of the memory as logically independent spaces. Further, reset vectors of CPUs other than CPU0 are set (Step 2007), and clock stop of CPUs other than CPU0 is released (Step 2008). At this point of time, CPUs other than CPU0 are reset (Step 2009). Then, it becomes possible for CPUs other than CPU0 to respectively load IPL from the memory regions which can be regarded as being occupied by themselves. Subsequently, CPU0 creates a domain and loads IPL for the operating system of the relevant central processing unit (CPU) into the relevant partially physical address space (Steps 2010 and 2012). The virtual machine manager is made to branch to IPL entries for the respective operating systems. Independently of Steps 2010 and 2012, CPUs other than CPU0 perform the following processes. The CPUs create the respective domains and load IPL for the respective operating systems into the relevant partially physical address spaces (Step 2011). The individual virtual machine managers are made to branch to IPL entries for the respective operating systems (Step 2013). According to the flow as described above, the virtual machine managers and the operating system on each domain start working. In the example of FIG. 20, the central processing unit CPU0 performs initialization first. However, the invention is not so limited.

Figure 21:
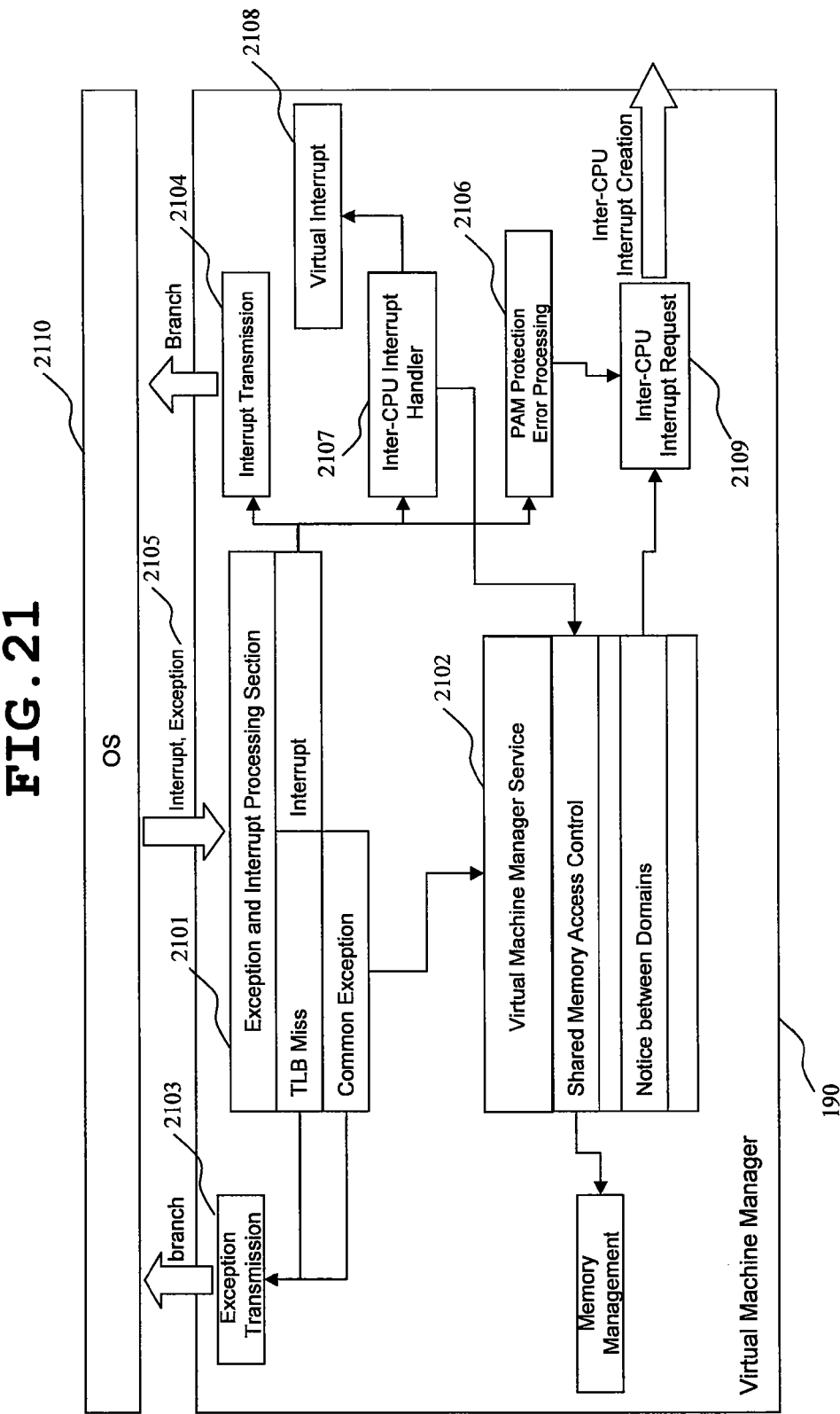
FIG. 21 is a composite diagram showing the configuration of a virtual machine manager module and the relation of functional apportionments and calling during the time of normal working.

FIG. 21 shows the module configuration of the virtual machine manager 190 brought into operation after the start sequence shown in FIG. 20 is terminated in the microprocessor 1 and execution flow transitions between the virtual machine managers and operating systems. When the operating system is started on the virtual machine manager 190 after termination of initialization, the control is handed over from the virtual machine manager 190 to the user program or operating system (2110). After that, the virtual machine manager 190 is activated only when the control is transferred owing to the occurrence of an interrupt or exception. The virtual machine manager 190 includes: an exception and interrupt processing section (2101) which transfers to a required service in response to an interrupt and exception; a virtual machine manager service section (2102) called by the exception and interrupt processing section (2102); and transmission processing sections (2103 and 2104) for performing transmission to the operating system or another virtual machine manager according to factors of an interrupt and exception. When an interrupt or exception is caused by an application or operating system (2105), the control is transferred to the virtual machine manager 190. This is the same mechanism as that for processes associated with an exception and an interrupt in a typical machine. In the case of a conventional combination of a machine and an operating system, an exception-and-interrupt handler located in an operating system kernel is used for processing. However, in the system according to the invention, the control is transferred to the virtual machine manager 190.

At the time, CPU shifts to the virtual machine manager mode (virtual machine manager mode (XVS Mode)), in which the operating system works and CPU can hold a greater authority than that in the privileged mode. The virtual machine manager performs the following needed processes according to the factors in the exception and interrupt processing section. As the first process, in the cases of a typical interrupt and exception such as a TLB miss and common exception, the execution flow branches to the operating system, which is a source thereof, the event in question is transmitted without processing by the virtual machine manager (2103 and 2104). As the second process, when a protection error by the physical address management module (PAM) is detected, it is notified as an interrupt. Then, the protection error is handled by a PAM protection error process (2106). As the third process, in the case where the processor is of a multi core type and an interrupt by other CPU occurs, an inter-CPU interrupt handler (2107) handles this into a virtual interrupt (2108) as inside produced by the virtual machine manager. The virtual machine manager 190 sets the factor to an interrupt register of CPU to be interrupted, and hands over the control to the operating system, whereby the interrupt is handled.

Figure 22:
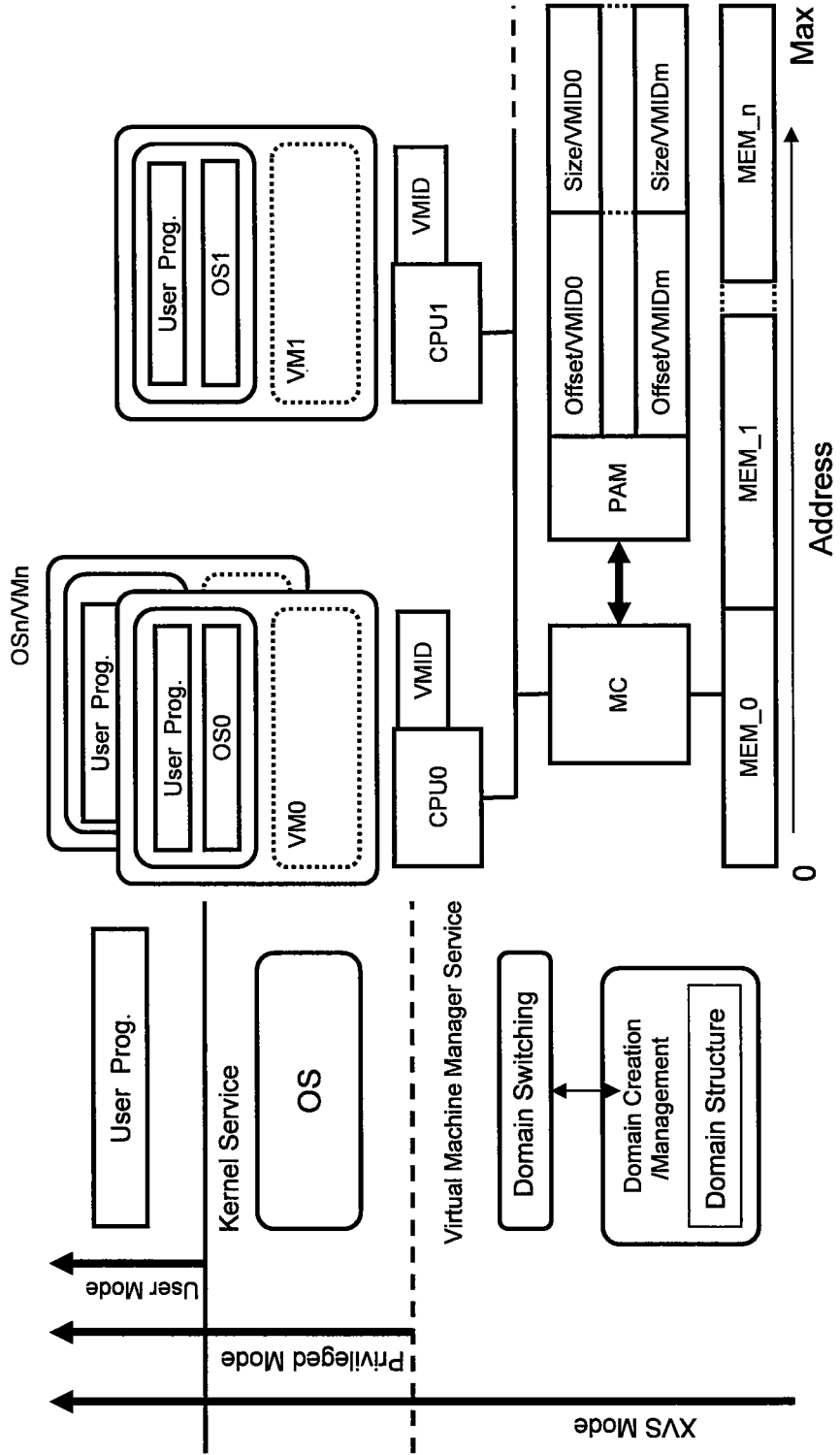
FIG. 22 is an illustration showing how to conduct offset addition and authority check by means of PAM and virtual machine manager mode (XVS Mode) in memory access from a plurality of virtual machines (VM)
Figure 23:
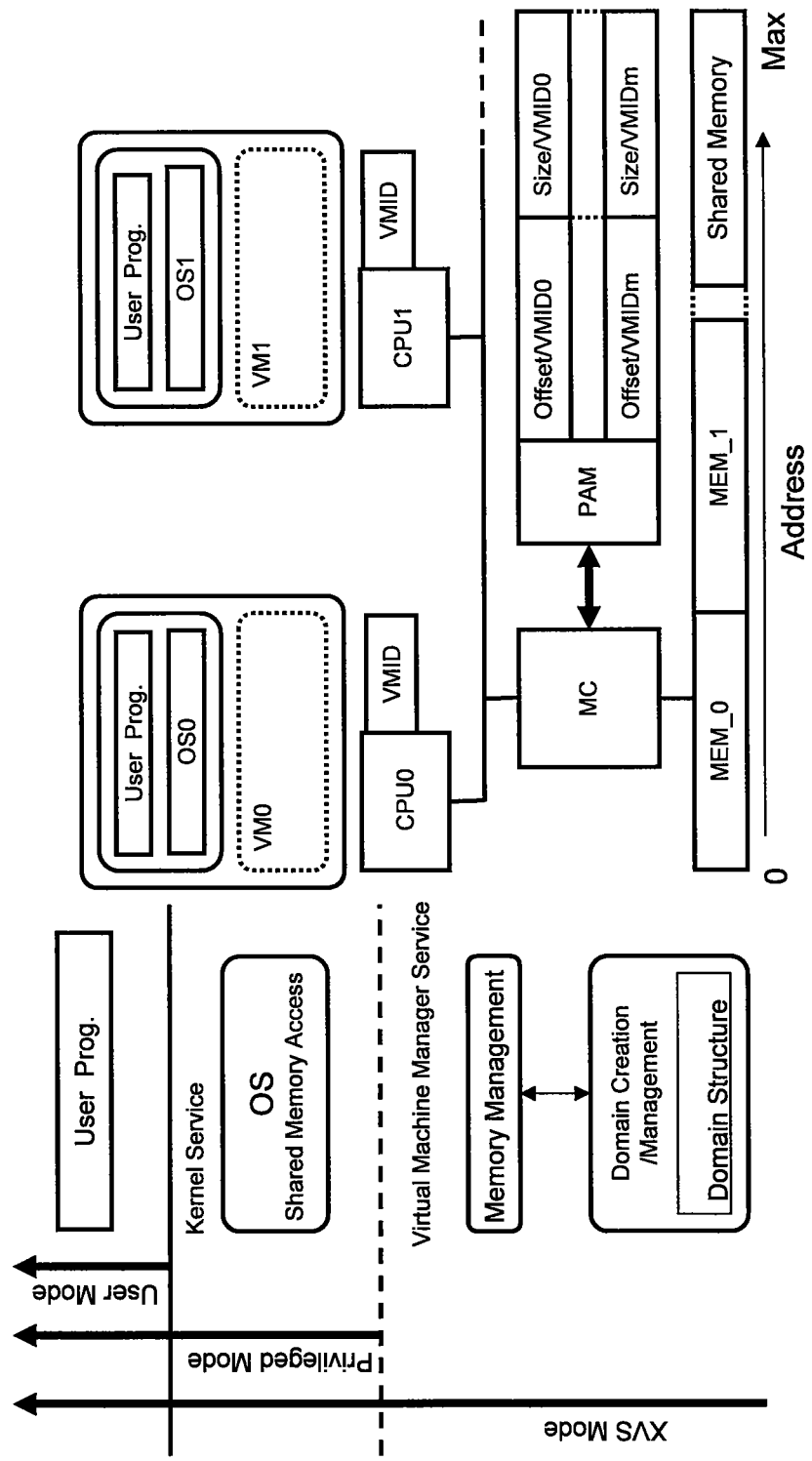
FIG. 23 is an illustration showing how to conduct communication between virtual machines (VM) via a memory using PAM and virtual machine manager mode (XVS Mode)

FIG. 22 shows a process for assignment of physical memories to virtual machines (VM), which the virtual machine manager 190 carries out. What corresponds to the virtual machine 101 shown in FIG. 1 as a combination of one VMDID and one operating system is a virtual machine (VM) such as VM0 or VM1 shown in FIG. 22. Herein, the assignment of physical memories to virtual machines (VM) by the virtual machine manager 190 is realized by the virtual machine manager 190 setting the entry table 111 of the physical address management module (PAM) 110. In the entry table 111 is set a piece of information of a physical memory region corresponding to VMID of each virtual machine (VM). As the physical address management module (PAM) 110 translates an address, the overhead produced by the virtual machine manager 190 can be reduced in access to a memory from the virtual machine (VM). FIG. 23 is a view showing the outline of a process for communication between domains, which the virtual machine manager 190 performs by use of a shared memory. What corresponds to the virtual machine 101 shown in FIG. 1, which is a combination of a VMID and an operating system, is one virtual machine (VM) such as VM0 or VM1 in FIG. 23.

When communication is performed between different virtual machines (VM) in the microprocessor 1, a shared memory is used to exchange information. The setting of such shared memory region is defined by a domain structure as in the case of setting a memory for VM, and the physical address management module (PAM) 110 sets the shared memory region. The virtual machine manager 190 has a mechanism for auditing the authority of access by the virtual machines (VM) defined by the domain structure. Therefore, when the virtual machine manager 190 uses a shared memory in communication, an improper access which is not granted by the domain structure can be blocked to carry out the communication securely. In the case where an application program or operating system running on a certain virtual machine (VM) attempts to communicate with another application program or operating system working on another virtual machine (VM), it uses a shared memory access service to request the virtual machine manager 190 for access to a shared memory. The memory management module of the virtual machine manager 190 judges the authority of access of the requester virtual machine (VM) in response to a request for a shared memory access service from the operating system. If the requester VM has the authority of access, the virtual machine manager 190 permits the requester VM its desired access. If not, the virtual machine manager 190 returns an error to the requester VM. The setting of an entry of the physical address management module (PAM), the authority-of-access judgment and the control flow in inter-VM communication using a shared memory will be described later with reference to FIGS. 27 to 31.

Figure 24:
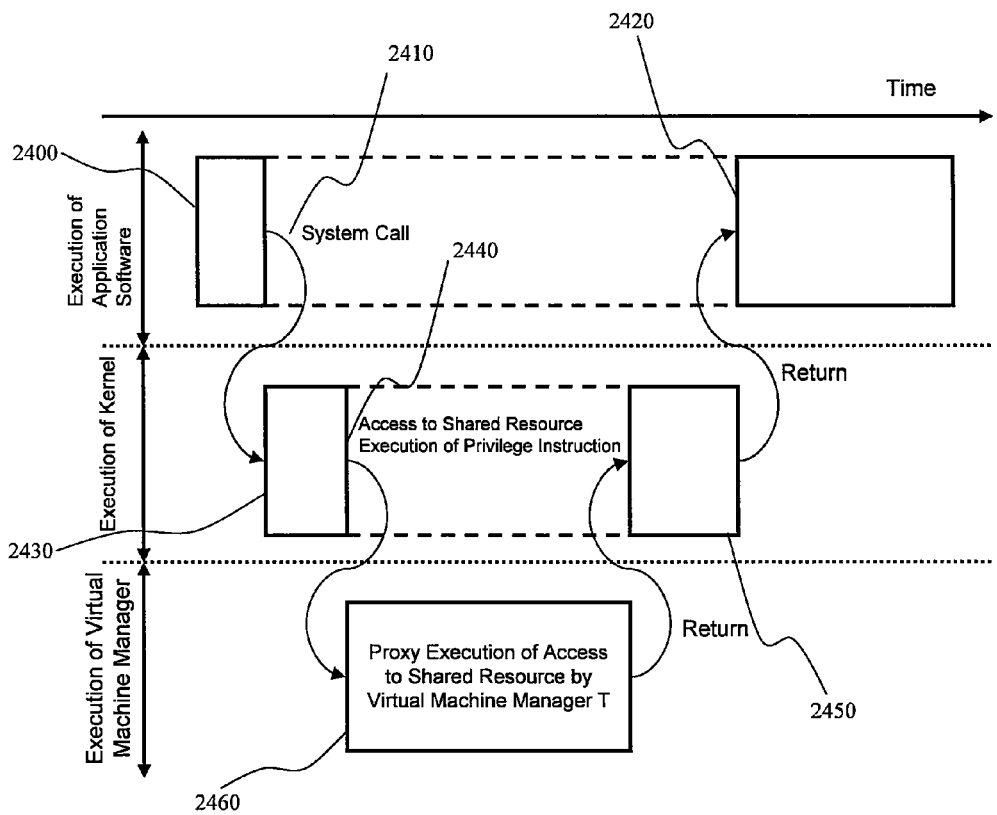
FIG. 24 is an illustration showing a process flow concerning access to CPU hardware resource shared by a plurality of virtual machines (VM) when the virtual machine manager performs trap and proxy execution (emulation)

FIG. 24 is an illustration showing a process for arbitrating accesses to a shared hardware resource form a plurality of virtual machines (VM). In the drawing, a series of processes when VM (101) working on one central processing unit (CPU) accesses a shared hardware resource, such as I/O device (I/O) 130 shown in FIG. 1, are shown in time sequence. In this embodiment, the access to a shared hardware resource corresponds to e.g. an access to Address Array of the translation look-aside buffer (TLB) shown in FIG. 3, and an access to a timer device in the microprocessor 1. When a request for a resource is generated by an application software at a point shown by the reference numeral 2410, a system call is issued. Then, the control is transferred to an operating system kernel, the relevant system call process indicated by the numeral 2430 is carried out. When in the course of the process a required privilege instruction is executed at the point indicated by the reference numeral 2440, CPU issues an exception, and transfers to the virtual machine manager mode (XVS Mode). Then, the virtual machine manager 190 provides service. If the system call is an access to a resource, such as a timer, shared by virtual machines, an operating system of the requester cannot access to a physical subject like a timer, and it ends up accessing an instance of the timer for each operating system. This is referred to as "proxy execution". The proxy execution is performed at the point indicated by the reference numeral 2460. The virtual machine manager 190 can know a target for the proxy execution from the type of the system call, and the address of a device to be accessed. For instance, if the device is a timer, the virtual machine manager 190 accesses a region secured as an instance for each operating system, and writes in or reads out of the region, thereby to conduct the proxy execution. After finishing the access, the virtual machine manager returns to the exception issuance source with the needed result value. The return process can be conducted by using e.g. a return instruction from exception, which is prepared for common processors. The operating system kernel, which has returned from the proxy execution in the virtual machine manager, regards the result value obtained by the process indicated by the reference numeral 2450 as the result value of the executed system call, returns to the point indicated by the reference numeral 2420, and finally returns to the application of the system call issuance source. This means for return is the same as the procedure to return a typical operating system from system call. The above-described procedure does not require an application software program and an operation system to change their program, but it allows a plurality of operating systems to access a shared resource while a process that a system call is handled as usual to access a resource is left.

Figure 25:
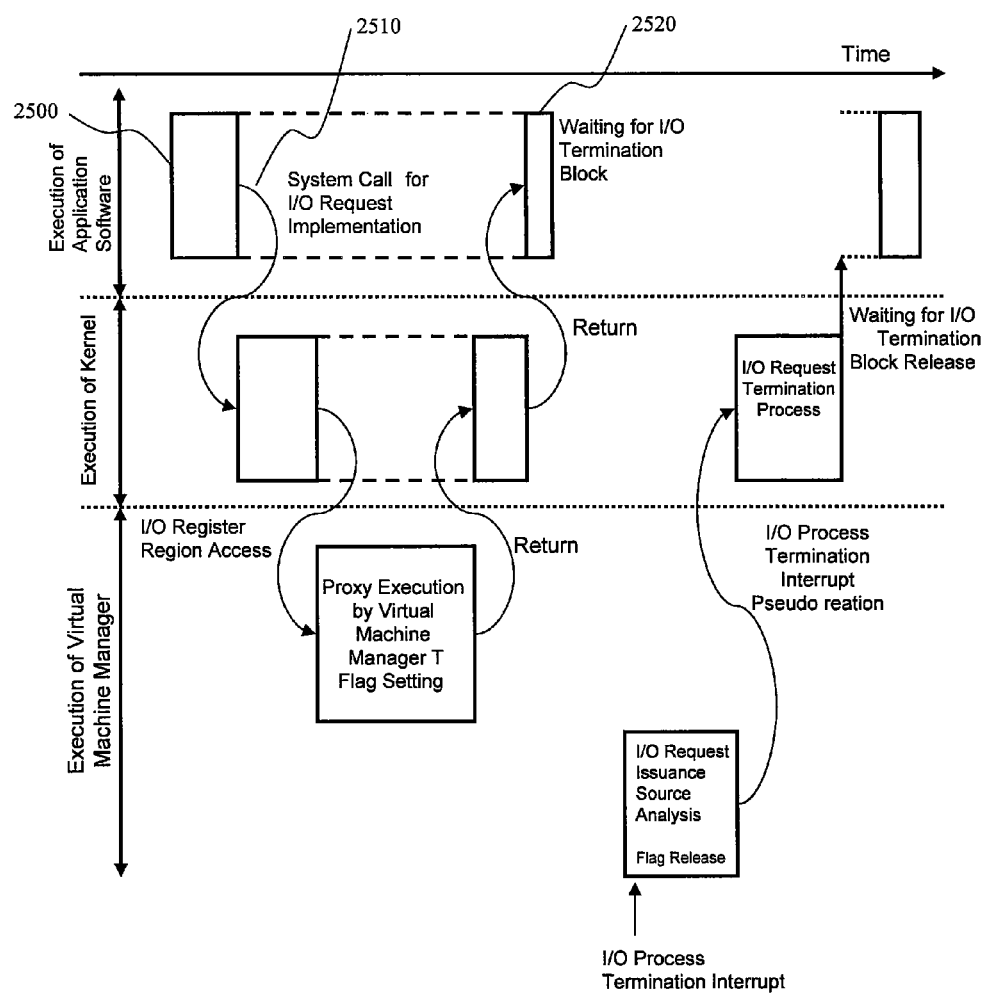
FIG. 25 is a diagram showing a sequence from start to end of a process, concerning I/O divided into a plurality of virtual machines (VM)

FIG. 25 shows a process for arbitrating accesses to a shared I/O device (I/O) by a plurality of virtual machines (VM). As in the case shown in FIG. 24, in the drawing, a series of processes when a virtual machine (VM) 101 working on a plurality of central processing units (CPU) accesses e.g. a shared I/O device (I/O) 130 shown in FIG. 1 are shown in time sequence. The series of processes shown here correspond to e.g. accesses to I/O Dev4 shown in FIG. 18. Particularly, here is shown the case where the shared I/O device (I/O) has an interrupt interface. Further, the process flow of an access to an exclusively used I/O device (I/O), which is not shared by a plurality of virtual machines (VM), is also described.

The first half portion of the sequence of I/O processing is the same as the flow shown in FIG. 24. When an application software issues a system call for I/O request, the operating system kernel receives it and carries out the process. In the course of the process, an access to an I/O register occurs. In the central processing unit (CPU) according to the invention, when the physical address management module (PAM) 110 as shown in FIG. 1 accesses a region of the I/O register, an exception occurs, and the central processing unit transfers to the virtual machine manager mode (XVS Mode). Then, the virtual machine manager offers service.

Now, the service by the virtual machine manager is classified into the following cases depending on the type of the I/O device. The first form is adopted in the case where the I/O device is occupied by one operating system. In this case, the virtual machine manager 190 recognizes the operating system which occupies that device. Therefore, on receipt of an I/O request from the operating system occupying the device, the virtual machine manager returns to the operating system kernel as it is. The operating system kernel performs a typical I/O operation, and returns to the system call issuance source. The second form is adopted in the case where the I/O device is shared by a plurality of operating systems. In this case, the operating systems using the device exercises mutually exclusive control, and therefore the virtual machine manager provides a flag as an exclusive control mechanism in a shared region for each shared device.

As described above, the virtual machine manager conducts the proxy execution, and an access to the I/O register is replaced with an access to an instance for each operating system. Further, as for the above-described exclusive control mechanism, a flag showing that the virtual machine manager of itself is using the device is set on the device. Here, if the flag has already been in ON state, the device is in use, and therefore an error is sent back to the operating system kernel. The return to the operating system kernel and return from the operating system kernel to the application software program are as described above.

As to the I/O processing, in addition to the above processes, a termination interrupt for the process is sent from the I/O device which has accepted a request. As shown in the example of an interrupt process, an interrupt is controlled by the interrupt controller (INTC) 107. As the first form, when the I/O device is occupied by one operating system, according to the allotment by the interrupt controller (INTC) 107, the virtual machine manager 190 of the operating system occupying the device receives an interrupt. The virtual machine manager 190 uses a virtual interrupt mechanism to inform the operating system managed by itself of I/O termination interrupt. The operating system kernel which has accepted the interrupt performs a typical I/O termination control and returns to the system call issuance source waiting for I/O termination. As the second form, when the I/O device is shared by a plurality of operating systems, an interrupt is sent to all the central processing units (CPU) as a result of allotment by the interrupt controller (INTC) 107, and the central processing unit (CPU) which has responded first is in the automatic allotment mode for processing. The virtual machine manager 190 of the central processing unit (CPU) which has received an interrupt in question makes reference to the exclusive control mechanism and detects the virtual machine manager 190 using the device in question. Then, the central processing unit uses the virtual interrupt mechanism to inform the operating system managed by the detected virtual machine manager 190 of I/O termination interrupt in the same way as that described above.

The operating system kernel, which has accepted an interrupt, performs a typical I/O termination operation, and returns to the system call issuance source waiting for I/O termination. In the case where the I/O device is shared by a plurality of operating systems, according to the above description, there is a process for sending a termination interrupt received in the automatic allotment mode to a correct operating system. However, the interrupt controller (INTC) 107 may send an interrupt from the device to the corresponding central processing unit (CPU) directly. Further, the process when the I/O device as described above is shared by a plurality of operating systems may be the same as the process when the I/O device is occupied by one operating system. Specifically, not the automatic allotment mode, but the fixed allotment mode is used with respect to an interrupt from a built-in peripheral device. Also, when the virtual machine manager uses the device in question, it is made possible to set a central processing unit (CPU) which is a destination of the allotment. As for execution of a shared device, there is a process for performing exclusive control. In a process executed while a shared device is used, the destination of allotment for an interrupt signal in question is set to the central processing unit (CPU) of the virtual machine manager 190 which requires the use of the device. After the termination of use of the device, in a process for releasing exclusive control, the interrupt controller (INTC) 107 is reset so as to be in the automatic allotment mode.

Next, an example of control of communication between virtual machines (VM) set by the virtual machine manager will be described. First, a method for setting the authority of access to a shared memory for inter-VM communication will be described with reference to FIGS. 26 and 27.

Figure 26:
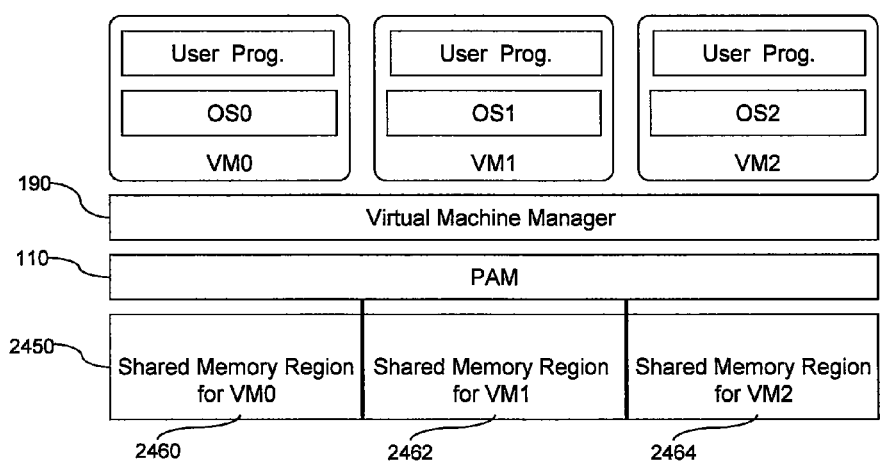
FIG. 26 is a block diagram showing a configuration in communication between virtual machines VM.

FIG. 26 shows an example of the configuration in inter-VM communication using a virtual machine manager. The virtual machine manager 190 as shown in FIG. 1 controls the physical address management module (PAM) 110, whereby a process shown with reference to FIG. 26 is executed. VM0, VM1 and VM2 are hereinafter virtual machines identified by VMID, which correspond to the virtual machines 101 shown in FIG. 1. The virtual machine manager 190 sets a shared memory region 2450 used by VM (VM0, VM1, VM2) for communication. In this time, the setting entry table 111 in the physical address management module (PAM) is used, and the entry table data as described with reference to FIG. 9 is used to set the authorities of access from other virtual machines VM with respect to the shared memory regions 2460, 2462, and 2464 assigned to the virtual machines VM0, VM1 and VM2. In short, the shared memory region 2460 is guaranteed in use by the virtual machine VM0, whereas use by the virtual machines VM1 and VM2 depends on the contents set in the setting entry table 111. Thus, a shared memory region can be divided logically (2460, 2462, 2464), and an access which violates the set authority of access, namely communication which is not permitted by the virtual machine manager can be blocked. A configuration that during the time of communication between virtual machines VM, compulsory access control by the physical address management module (PAM) 110 is conducted with respect to all communications can be achieved. Therefore, an access control that the physical address management module (PAM) 110 is used as a reference monitor can be achieved.

The setting entry table 111 of the physical address management module (PAM) 110 can be set only by the virtual machine manager 190. When the virtual machine manager 190 works in the virtual machine manager mode (XVS Mode), software programs working on a virtual machine (VM) such as an operating system working in the privileged mode, and a user program (application program) running in the user mode can be prevented from conducting unauthorized rewrite of an address range, and authority of access, etc. in the setting entry table 111 of the physical address management module (PAM) 110.

In a hardware unit having no virtual machine manager mode (XVS Mode), the virtual machine manager works in the privileged mode. However, in this case, unauthorized rewrite by an application program running in the user mode can be prevented. In addition, unauthorized rewrite of the setting entry table of the physical address management module (PAM) 110 can be prevented as long as an operating system works properly. Memories which can be used as a shared memory for communication between virtual machines are a memory in the microprocessor 1, which is located in a place which enables access control by the physical address management module (PAM) 110, SDRAM (synchronous Dynamic Random Access Memory), and other memories used as a main storage device such as the memory (MEM) 120. While in the case of FIG. 1, the memory 120 is mounted on the microprocessor 1 in the on-chip form, it may be another type chip.

FIG. 27 shows examples of settings of the following fields in the setting entry table 111 of the physical address management module (PAM) 110: SRC field, SMSK field, PID field, PMSK field, PR field and PW field. For ADDR field and AMSK field, an address range assigned as a shared memory for communication between virtual machines VM is assigned is specified. In the case where ADDR=H'AFF0, AMSK=H'FFF0 are set (H' means sexadecimal), this amounts to that a region of one MBytes ranging from H'AFF0_0000 to H'AFFF_FFFF is declared. Therefore, if an addr signal having a value other than this set value is input to the physical address management module (PAM) 110, the access to this region is not granted according to the Access Granted-judging algorithm as shown in FIG. 10. For SRC field (2500) and SMSK field (2502), a bus master device is set to grant communication between virtual machines VM. In the case where SRC=H'03 and SMSK=B'1 (B' means binary number), only when an src signal input to the physical address management module (PAM) 110 is of H'03, the access is granted according to the Access Granted-judging algorithm shown with reference to FIG. 10. When SRC=H'00 AND SMSK=B'0, access is granted with an src signal having an arbitrary value according to the Access Granted-judging algorithm shown with reference to FIG. 10. For PID field (2504) and PMSK field (2506), a VM identification number (VMID) is set to grant communication between virtual machines VM. In the case where PID=H'02 AND PMSK=B'1, an access is granted only when the pid signal is of H'02 according to the Access Granted-judging algorithm shown with reference to FIG. 10. In the case where PPID=H'00 AND PMSK=B'0, access is granted with an src signal having an arbitrary pid signal value according to the Access Granted-judging algorithm shown with reference to FIG. 10.

For PR field (2508) is set read authority. For PW field (2510) is set write authority. When PR=B'1 and PW=B'1, Read granted/Write granted. When PR=B'1 and PW=B'0, only read access is granted. When PR=B'0 and PW=B'0, access is not granted.

The combinations as described enable flexible settings of the authority of access with respect to the setting entry table 111 of the physical address management module (PAM) 110. When entries are set as shown in FIG. 27 (1), there is no access restriction, and therefore read and write from any virtual machines (VM) are enabled. When ADDR and AMSK are set to the same value in the entry setting shown by (2) and (3) in FIG. 27, Read and Write Granted region extends from a virtual machine (VM) with src=H'03 and a virtual machine (VM) with pid=H'02. When ADDR and AMSK are set to the same value in the entry setting shown by (2) and (5) in FIG. 27, a Read and Write Granted region extends from a virtual machine (VM) with src=H'03, and Read Granted region extends from a virtual machine (VM) with src=H'1B and pid=H'77. When only the entries shown by (4) in FIG. 27 are set with respect to a certain ADDR/AMSK setting, the region becomes a region only for a virtual machine (VM) with src=H'05 and pid=H'0A.

As stated above, communication which can be compulsorily controlled in access by the physical address management module (PAM) 110 can be materialized by setting the authority of access to a shared memory, creating a message-sending queue on the shared memory, and performing data copy with the shared memory. Therefore, the reliability of an operating system working on a virtual machine (VM) and security can be improved by increasing the reliability of communication paths, and the security of communication.

Figure 28:
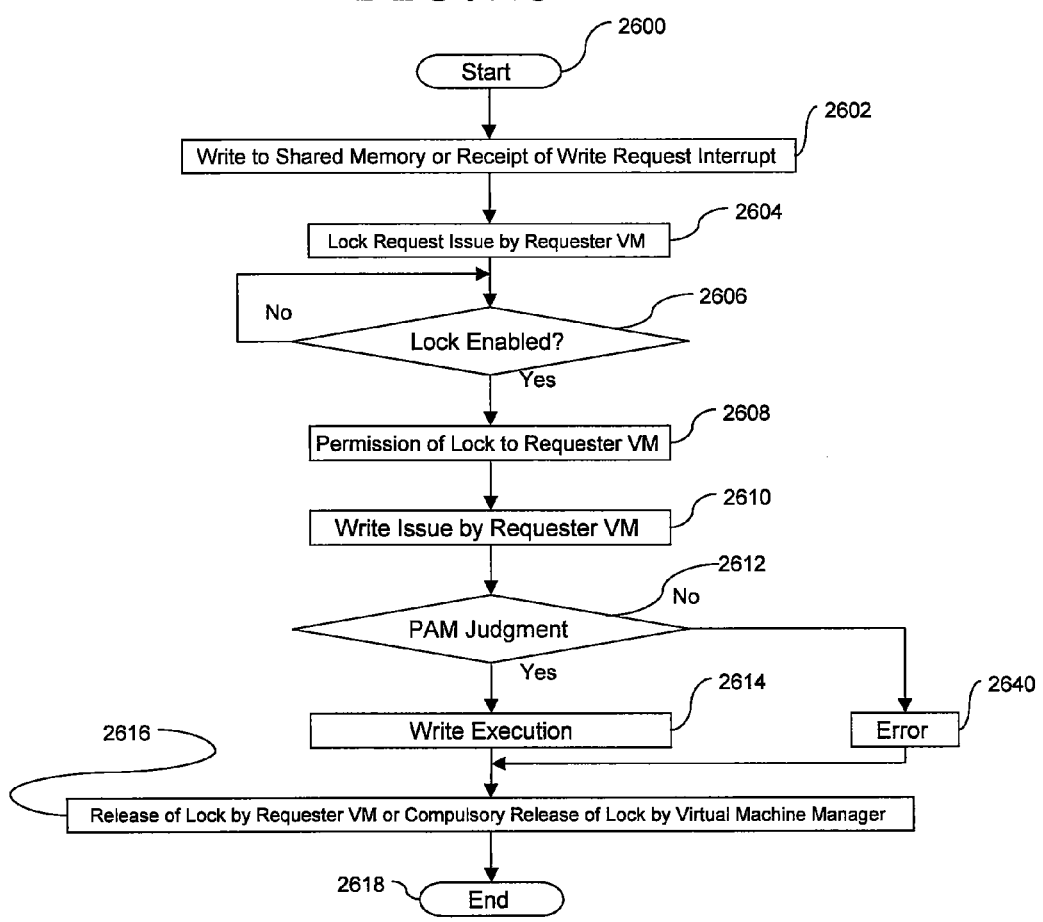
FIG. 28 is a control flow chart in writing to a shared memory for communication between virtual machines VM.

Next, referring to FIGS. 28 to 30, a control flow in accessing the shared memory for communication between virtual machines VM will be described. FIG. 28 shows a control flow in writing to the shared memory for communication between virtual machines VM. The virtual machine manager 190 as shown in FIG. 1 controls the physical address management module (PAM) 110, whereby a chain of processes shown in FIG. 28 is executed. The virtual machine (VM) is hereinafter one virtual machine identified by VMID, which corresponds to the virtual machine 101 shown in FIG. 1. When a certain virtual machine (VM) attempts to write to a shared memory for communication between virtual machines VM (Step 2602), the VM issues an exclusive access right request (lock request) to the virtual machine manager (Step 2604). On receipt of the lock request from the virtual machine (VM), the virtual machine manager 190 judges whether or not other virtual machine (VM) has locked (Step 2606). When other virtual machine (VM) keeps locking, the virtual machine waits for release of the lock. When no virtual machine (VM) has locked, the virtual machine manager permits the requester virtual machine (VM) to lock (Step 2608). The requester virtual machine (VM) having gained permission to lock issues a write command (Step 2610). The physical address management module (PAM) 110 accepts, as inputs, auth signal, opc signal, src signal, pid signal and addr signal through the bus BUS, and judges whether or not the virtual machine (VM) has a write authority based on agreement and disagreement with set values of respective fields of the entry table following the Access Granted-judging flow shown in FIG. 10 (Step 2612). When the virtual machine (VM) is judged to have a write authority, the virtual machine writes to the shared memory (Step 2614). After having finished writing, the requester virtual machine (VM) releases the lock and terminates processing. When the virtual machine (VM) is judged to have no authority of access, the physical address management module (PAM) 110 denies the access, returns an error (Step 2640), releases lock, and terminates processing (Steps 2616, 2618).

To achieve the function shown in FIG. 28, the virtual machine manager has a function of imparting an exclusive access right to the virtual machine (VM) (lock permission), a function of releasing the lock (lock release), and a function of storing and judging whether or not the exclusive access right is imparted to the virtual machine (VM), whereby collision of accesses is avoided.

If a certain virtual machine (VM) occupies the access right to the shared memory for a long time, other VM cannot communicate, and it becomes difficult to guarantee QoS (Quality of Service), which can lead to deterioration of the reliability of the whole system. To avert such situation, the virtual machine manager has a function of compulsorily releasing the right of lock imparted to the virtual machine (VM). Compulsory release of lock by the virtual machine manager is performed at Step 2616 e.g. when a length of time has elapsed (or at the timeout). The release of lock (Step 2616) after the issue of an error (Step 2640) may be either lock release by a requester virtual machine (VM) or compulsory lock release by the virtual machine manager.

Another virtual machine (VM) can request some virtual machine (VM) to write to the shared memory at Step 2602. To materialize this function, the virtual machine manager has an interrupting function to send another VM a request for write to the shared memory for communication between virtual machines VM. The virtual machine manager issues a write request interrupt to the request receiver VM, thereby to notify the write request. On receipt of the write request interrupt, the virtual machine (VM) issues a lock request to the virtual machine manager. After that, the processes after Step 2604 are performed.

Figure 29:
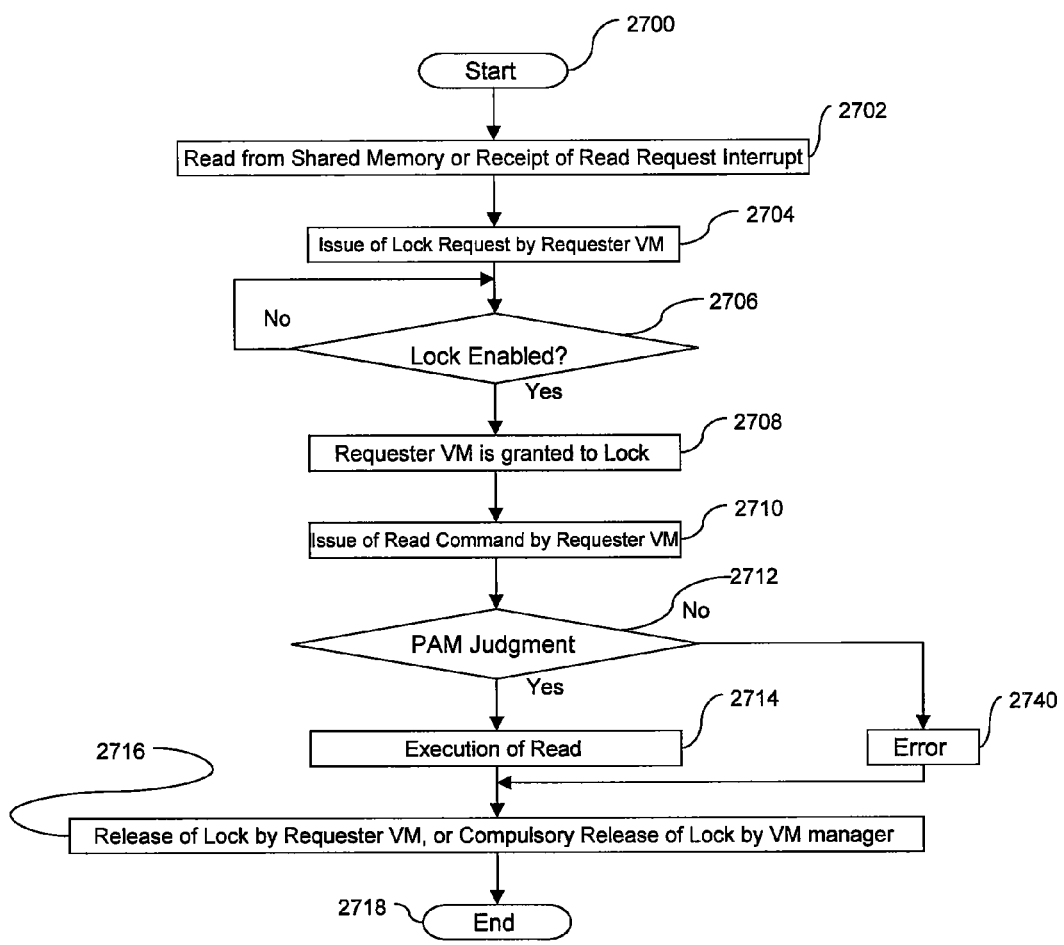
FIG. 29 is a control flow chart in reading the shared memory for communication between virtual machines VM.

FIG. 29 shows a control flow in reading from the shared memory for communication between virtual machines VM. The virtual machine manager 190 as shown in FIG. 1 controls the physical address management module (PAM) 110, whereby a chain of processes shown in FIG. 29 is conducted. Hereinafter, VM represents one virtual machine identified by VMID, which corresponds to a virtual machine as denoted by the reference numeral 101 in FIG. 1. When a certain virtual machine (VM) attempts to read from the shared memory for communication between virtual machines VM (Step 2702), the VM issues an exclusive access right request (lock request) to the virtual machine manager (Step 2704). On receipt of the lock request from the virtual machine (VM), the virtual machine manager judges whether or not other virtual machine (VM) has locked (Step 2706). When other virtual machine (VM) keeps locking, the virtual machine waits for release of the lock. When no virtual machine (VM) has locked, the virtual machine manager permits the requester VM to lock (Step 2708). The requester VM having gained permission to lock issues a read command (Step 2710). The physical address management module (PAM) 110 accepts, as inputs, auth signal, opc signal, src signal, pid signal and addr signal through the bus, and judges whether or not the virtual machine (VM) has a read authority based on agreement and disagreement with set values of respective fields of the entry table following the Access Granted-judging flow shown in FIG. 10 (Step 2712). When the virtual machine (VM) is judged to have a read authority, the virtual machine reads from the shared memory (Step 2714). After having finished reading, the requester VM releases the lock and terminates processing. When the virtual machine is judged to have no access authority, the physical address management module (PAM) 110 denies the access, returns an error (Step 2740), releases lock, and terminates the process (Steps 2716, 2718).

At Step 2702, other VM may request a certain VM to read from the shared memory. For instance, after having finished writing to the shared memory, a virtual machine VM may desire to notify the other communication party of that it is in a state where it can read from the shared memory. To realize this function, the virtual machine manager has an interrupting function to send another VM a request for reading from the shared memory for communication between virtual machines VM. The virtual machine manager issues a read request interrupt to the request receiver VM, whereby the read request is notified. On receipt of the read request interrupt, the virtual machine (VM) issues a lock request to the virtual machine manager. After that, the processes after Step 2704 are performed.

The lock function of the virtual machine manager is used for lock control, which has been stated in the description with reference to FIG. 28. Release of lock (Step 2716) after issue of an error (Step 2740) may be performed by the requester VM, or compulsorily performed by the virtual machine manager.

Figure 30:
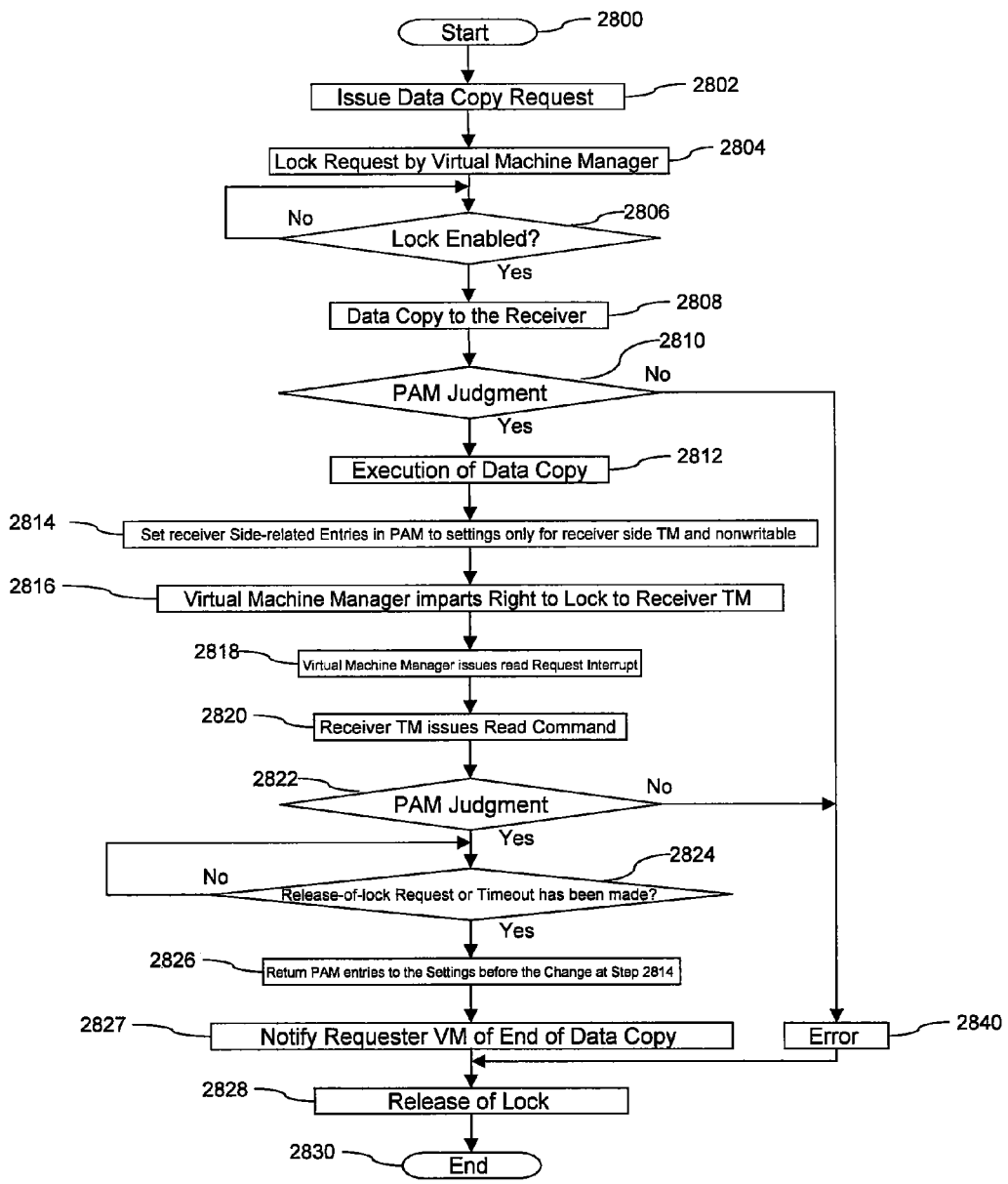
FIG. 30 is a flow chart of data copy control by the virtual machine manager in communication between virtual machines VM.

FIG. 30 shows a control flow in the case where the virtual machine manager performs data copy from the shared memory for communication of a certain virtual machine (VM) to the shared memory for communication of another VM on behalf of them. The virtual machine manager 190 as shown in FIG. 1 controls the physical address management module (PAM) 110, whereby a chain of processes shown in FIG. 30 is conducted. Hereinafter, the virtual machine (VM) represents one virtual machine identified by VMID, which corresponds to a virtual machine as denoted by the reference numeral 101 in FIG. 1. This control is used in the case where in the setting entry table 111 of the physical address management module (PAM), e.g. only the entries shown in (4) of FIG. 27 are set for a certain shared memory region range (ADDR/AMSK setting), i.e. the case where the shared memory region is set as a region only for a particular VM. This region only for a particular VM is set for a virtual machine (VM) which must not trust an operating system running on other VM, and software programs such as an application program, and be influenced by other VM, therefore requires high reliability and security. As the virtual machine manager 190 works in the virtual machine manager mode (XVS MODE), this type of data copy is never affected by bugs of an operating system, an application program, and computer virus and malware infections. Thus, higher reliability and security are achieved compared to a software program working on VM. Therefore, data copy by the virtual machine manager 190 offers higher reliability and security than those achieved by data copy by a software program working on the virtual machine (VM). When a certain virtual machine (VM) issues a data copy request to other VM (Step 2802), the virtual machine manager issues a lock request (Step 2804). The virtual machine manager judges whether or not other virtual machine (VM) has locked (Step 2806). When other VM keeps locking, the virtual machine waits for release of the lock. When no virtual machine (VM) has locked, a process for copying data specified by the requester VM into a shared memory of the receiver VM is executed (Step 2808). The physical address management module (PAM) 110 accepts, as inputs, auth signal, opc signal, src signal, pid signal and addr signal through a bus, and judges whether or not details of the request of the requester VM agree with set values of the fields of the entry table, and whether or not the requester VM has a write authority to the shared memory of the receiver following the Access Granted-judging flow shown in FIG. 10 (Step 2810). When the requester VM is judged to have no write authority, an error process is executed (Step 2840), followed by release of lock (Steps 2828 and 2830). Then, the process is terminated. When the requester VM is judged to have the write authority, data is copied into the shared memory of the receiver VM (Step 2812). After completion of data copy, the virtual machine manager sets the entries for the shared memory of the receiver VM in the physical address management module (PAM) 110 into dedicated to use by the receiver VM and write-prohibited (PW=B'0) (Step 2814). This can reduce the risk that an extraneous VM makes reference to important information such as confidential data, and the risk that an extraneous VM rewrite such important information. The rewrite of settings may be performed on the region to which data is copied, or all the shared memory region of the receiver TM.

When setting of entries for the shared memory of the receiver VM in the physical address management module (PAM) 110 is finished, the virtual machine manager grants permission to lock to the receiver VM (Step 2816), and issues a read request interrupt to the receiver VM (Step 2818). Then, the receiver VM issues a read command (Step 2820). As a result of judgment by the physical address management module (PAM) 110 (Step 2822), if the access is judged as being unpermitted like the case of write to a region to which data is copied, an error process is executed (Step 2840). When the access is judged as being permitted read, the virtual machine manager waits for a release-of-lock request from the receiver VM or timeout (Step 2824), and thereafter conducts a process for rewriting the entries, which have been rewritten at Step 2814, into the settings prior to the rewrite at Step 2814 (Step 2826). After that, the virtual machine manager notifies the requester VM of completion of data copy (Step 2827), release the lock (Step 2828), and terminates the process. For the lock control, the lock function of the virtual machine manager, which has been already described with reference to FIG. 28, is used.

Figure 31:
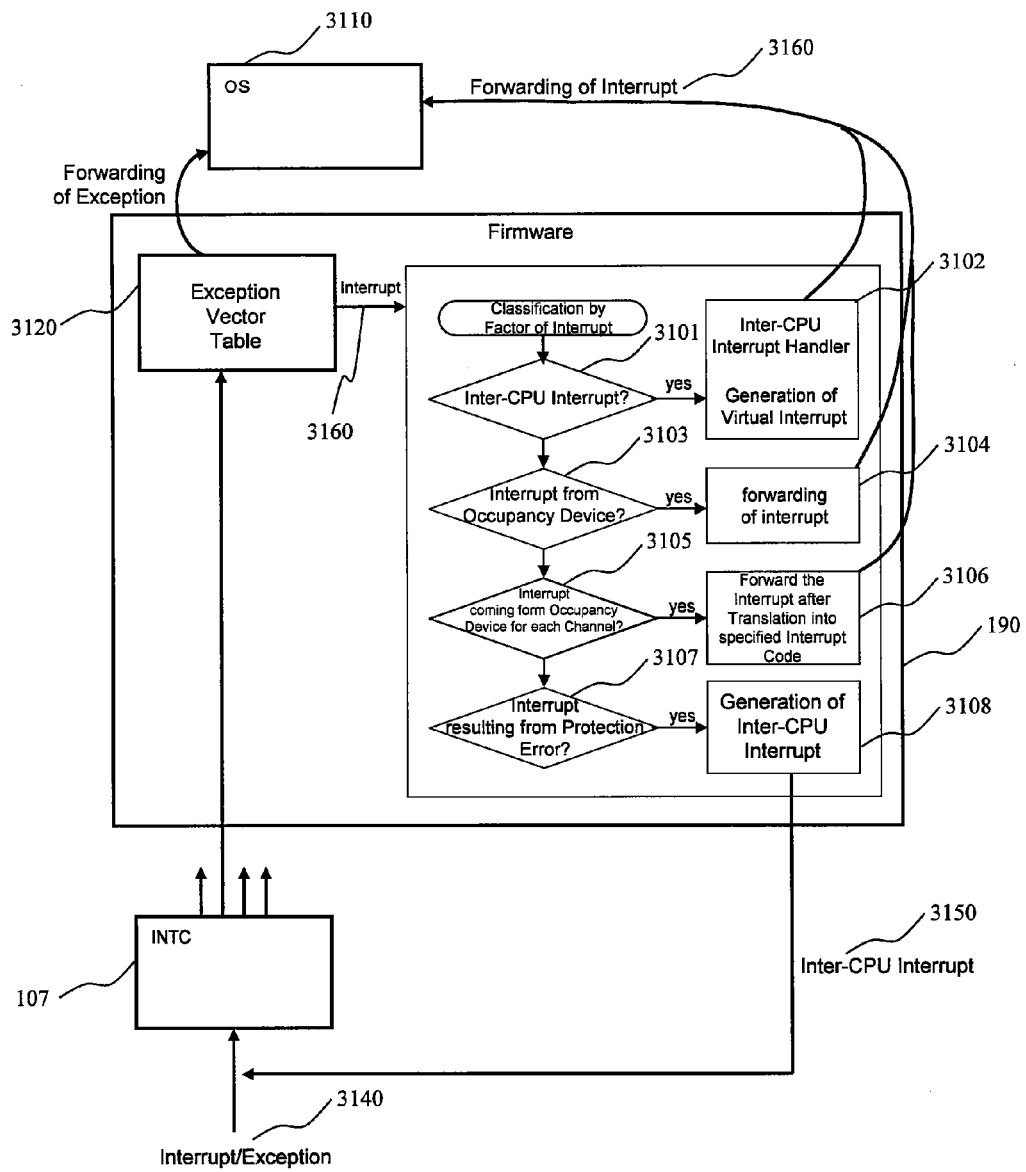
FIG. 31 is an illustration showing a process flow of the virtual machine manager and an exception process-selecting table according to an exception event.
Figure 32:
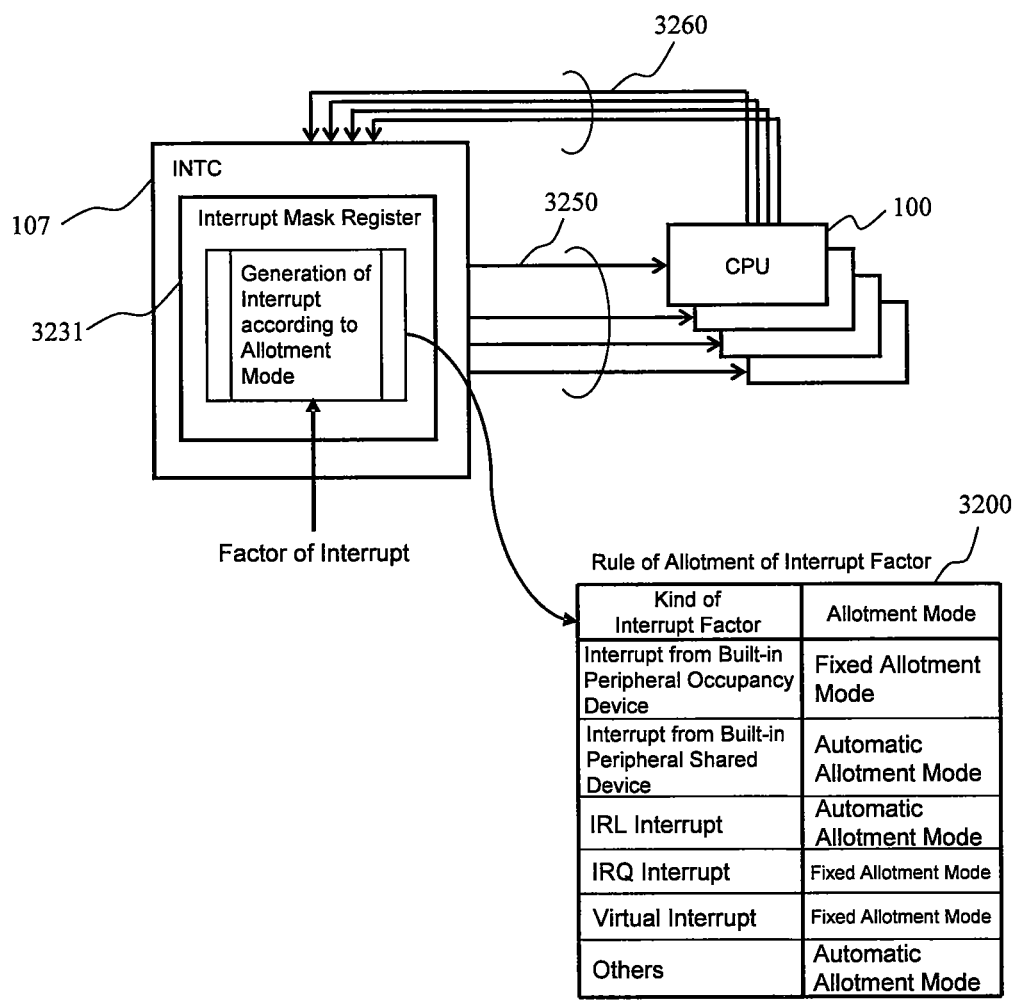
FIG. 32 is an illustration showing an example of setting rule of an interrupt allotment mode.

Next, the method for allotting exceptions and interrupt requests by the virtual machine manager will be described with reference to FIGS. 31 and 32. The part indicated by reference numeral 3110 is an operating system corresponding to a portion shown by 101 in FIG. 1. In a multi core system equipped with a virtual machine manager 190, interrupt and exception are processed following the flow as shown in FIG. 31. Some of interrupts and exceptions are notified to CPU from the outside, and others are notified from the inside of CPU. A notice from the outside is sent to the interrupt controller (INTC) 107 regardless of the factor of interrupt or exception, and then send from INTC 107 to CPU.

FIG. 15 shows a interrupt allotment controlling mechanism. The virtual machine manager 190 sets the mask register in PRIORITY as shown in FIG. 15. The input interrupt signal will be transmitted to one or more CPUs, provided that the destination of the input signal is determined by the mask. The mask is set when the virtual machine manager is activated and initialized at the time of starting the computer. In the case like this, a predetermined transmission path for interrupt can be specified according to the configuration of a computer system. Also, this setting may be made at the point of time when control is transferred to the virtual machine manager while an application program is running. Further, the forwarding address of an interrupt can be dynamically changed according to the state of execution or the interrupt factor. The virtual machine manager 190 sets the mask register following a correspondence table of interrupt factors' kinds and allotting modes shown in FIG. 32. What is denoted by the reference numeral 3200 is the correspondence table for associating interrupt factors' kinds to allotting modes. The correspondence table is set when the computer system is initialized by the virtual machine manager 190. Based on the table, e.g. an interrupt from a hardware device for processing a moving image is handled as an interrupt coming from "built-in peripheral device", and then the fixed allotment mode is selected. As in FIG. 32, when an interrupt caused by the dynamic image processing device enters the interrupt controller (INTC) 107, an interrupt signal 3250 is sent to CPU 100 (which controls the dynamic image processing hardware device directly) by the mask of the interrupt mask register 3231, provided that CPU is predetermined according to the interrupt factor. On the other hand, in the case of an interrupt coming from a shred device e.g. hard desk device shared by a plurality of CPUs, the automatic allotment mode is selected. In this case, no mask is applied, all the CPUs receive an interrupt signal. The CPU which has received the interrupt signal first sends back an interrupt receipt signal 3260, and thereafter the interrupt is handled. When an interrupt and exception are notified to CPUs, a reference to the exception vector table as shown in FIG. 31 is made, and the processes depending on the interrupt and exception factors are executed. The processes so far are the same as the processes conducted by a common CPU and the control system therefor.

After that, in the multi core system having a virtual machine manager 190 according to the invention, a chain of processes as described below are conducted according to the arrangement as shown in FIG. 31. Some of interrupts, whose factors are TLB error and a common exception attributed to a processor, are notified from the inside of CPU. Such interrupts are forwarded by the virtual machine manager along the branches toward programs including an operating system, which are sources of the interrupts, as they are. After that, they are processed by interrupt/exception processing mechanisms which an operating system and a control program have originally. When the factor is an interrupt from the outside, it is classified into four as described below and then processed.

[Factor 1] Inter-CPU Interrupt

In this case, an interrupt comes from other CPU in a multi core processor. The interrupt controller (INTC) 107 as shown in FIGS. 15 and 32 is used as the interrupt allotment mechanism. Thanks to the interrupt controller 107, an appropriate CPU and virtual machine manager receive this interrupt. The interrupt is processed by "inter-CPU interrupt handler" as shown in FIG. 31, where an exception code and interrupt register are set. Then, "virtual interrupt" is produced. The virtual interrupt behaves like an interrupt coming from a built-in module of CPU which has accepted the interrupt. On receipt of the virtual interrupt, the virtual machine manager 190 forwards it to an operating system under the management of itself. After that, the interrupt is treated as in the case where the factor of the interrupt is TLB error or common exception of a processor.

[Factor 2] Interrupt from Occupancy Device

As in the above-described first case, the interrupt is sent to the central processing unit (CPU) and virtual machine manager, which should handle the interrupt, thanks to the interrupt controller. On receipt of the interrupt, the virtual machine manager forwards the interrupt to the operating system under the management of itself. Therefore, the interrupt is treated as in the case where the factor of the interrupt is TLB error or common exception of a processor.

[Factor 3] Interrupt Coming Form Occupancy Device for Each Channel

In this case, an interrupt is created by an occupancy device in channels as in a direct memory access mechanism. As in the second case, thanks to the interrupt controller 107, the central processing unit (CPU) and virtual machine manager, which should deal with the interrupt, receive it. On receipt of the interrupt, the virtual machine manager forwards the interrupt to the operating system under the management of itself. Therefore, the interrupt is treated as in the case where the factor of the interrupt is TLB error or common exception of a processor.

[Factor 4] Interrupt Resulting from Protection Error by Physical Address Management Module (PAM) 110

As in the above-described cases, interrupt is sent to the central processing unit (CPU) and virtual machine manager 190, which should handle it, thanks to the interrupt controller 107. In this type of interrupt, the control of the shared memory access is performed by the virtual machine manager 190, and therefore an inter-CPU interrupt is generated to send a notification to the central processing unit (CPU) targeted for control. The resultant inter-CPU interrupt is sent to the interrupt controller (INTC) 107 and then processed by the central processing unit (CPU) and virtual machine manager appropriately, as in the above second case.

FIG. 33 shows an action when a reset signal is input to the microprocessor 1 according to the invention in response to an outside or internal request. The firmware denoted by the reference numeral 3300 is a control program in the virtual machine manager 190 as shown in FIG. 1. The reference numeral 3310 denotes an environment where an operating system identified by VMID works, which corresponds to a virtual machine as denoted by the reference numeral 101 in FIG. 1. Assume that a reset signal 3340 is input to the microprocessor 1. In the case where the reset signal is generated by power-on reset, the entire chip of the microprocessor is reset by the reset signal 3331, and then a typical reset processing is performed. In contrast, when the reset signal is produced by manual reset, the signal is selected at RSTTOIRQ shown in FIG. 15. The register is treated as an interrupt factor at "1", and a reset interrupt signal 3332 is output, which is targeted for interrupt allotment in PRIORITY shown in FIG. 15. The reset interrupt signal 3332 is turned to the automatic allotment mode according to selection of the allotment mode in the interrupt controller (INTC) 107 as shown in FIG. 32. Then the resultant signal is sent to all the CPUs as signals 3333. Of the CPUs, the CPU that has accepted the signal first uses the virtual machine manager 190 to process the signal. The processing is carried out following the reset interrupt process flow shown within a range indicated by the numeral 3300. When the interrupt is reset interrupt to the physical central processing unit (CPU) (Step 3301), a reset signal for the corresponding physical central processing unit (CPU) is output (Step 3302). This is performed by setting RSTTOIRQ to "0" corresponding to the targeted central processing unit (CPU) and re-issuing a manual reset from the virtual machine manager. In the case of reset for the virtual machine, the signal is processed assuming that a virtual reset interrupt has been generated in the virtual machine manager. In the case where it is reset to a virtual machine under the management of the virtual machine manager (located in its own domain), which has accepted the interrupt (Step 3303), one or more virtual machines under the management of the virtual machine manager are forced to shift to the initial states by software processing (Step 3304). In the case where the target of reset interrupt is a virtual machine located outside the range managed by the virtual machine manager which has accepted the interrupt, i.e. the target virtual machine is in the other domain (Step 3305), the virtual reset interrupt is notified as "virtual interrupt" to another central processing unit (CPU) in charge of the management of the virtual machine which has to treat with the interrupt. According to the interrupt procedure, in the fixed allotment mode as an allotment mode selected in the interrupt controller (INTC) 107, a reset virtual interrupt is sent to the target central processing unit (CPU). The virtual machine manager in charge of the management of the central processing unit (CPU) forces one or more virtual machines to shift to the initial states by means of software processing.

While the invention made by the inventor has been described above specifically based on the embodiments, it is not so limited. It is needless to say that various changes and modifications may be made without departing from the subject matters thereof.

For instance, as for the example of FIG. 2, the microprocessor may be formed by a combination of a conventional central processing unit and a physical address management module (PAM) 110 (First Modification). In this case, both the foresaid virtual machine manager 190 and operating system run in the privileged mode. However, in this case, the effect of lightening the mutual influence between working domains is reduced. Also, as for the example of FIG. 1, it is possible to combine a central processing unit (CPU) and a physical address management module (PAM) 110, of the systems as shown in FIGS. 16 and 17 (Second Modification). Also, in this case, the effect of lightening the mutual influence between working domains is reduced. The example of FIG. 16 corresponds to the example shown in FIG. 3. The example of FIG. 17 corresponds to the example shown in FIG. 5. The register portion termed STID in FIG. 16 corresponds to VMID register in FIG. 13. However, the VMID register is composed of eight bits, STID is a register of one bit. Further, the register portion termed NS in FIG. 17 corresponds to the VMID memory in FIG. 5. However, VMID memory is of eight bits, and NS is composed of one bit. Also, as for a microprocessor having hardware structures as shown in FIGS. 16 and 17 according to the second modification, the system embodied according to the invention can be materialized by a virtual machine manager in charge of the control of the microprocessor.

In the first modification, of the table entries shown in FIG. 9, PID field and PMSK field are removed, and the remaining entries are used to form a setting register table. Further, in the first modification, adoption of the algorithm with judgment of pid signal at Step 1002 shown in FIG. 10 removed suffices. The first modification differs from the embodiment of the invention in inspection of authority-of-access signal in the comparator circuit AUTHCOMP shown in FIG. 11. Specifically, in the embodiment shown in FIG. 11 accesses to PAMENTRY_1-16 must be conducted by a program working in the virtual machine manager mode (XVS Mode), whereas in the first modification such accesses must be performed by a program working in the privileged mode. In the first modification, the interrupt and type of exception in a central processing unit (CPU), forms of destination-of-transition addresses at the time of the occurrence of the interrupt and exception are the same as those of a conventional central processing unit (CPU). Further, it is desirable that in the first modification, the virtual machine manager software works harmoniously with an operating system in the privileged mode.

What is claimed is:
1. A data processor comprising:
a central processing unit, in which a plurality of virtual machines, each running an application program under controls of different operating systems, and a virtual machine manager for controlling the plurality of virtual machines, are selectively arranged according to information set in mode registers, wherein the mode registers include a virtual machine identification (ID) register, a CPU operating mode register, and an expanded CPU operating mode register;
a resource access management module for managing access to a hardware resource available for the plurality of virtual machines, the resource access management module including a control register and a comparison circuit, wherein the control register stores read protect information and write protect information for each respective virtual machine to access the hardware resource; and an internal bus connecting the central processing unit and the resource access management module, wherein the resource access management module accepts, as inputs, the information set in the mode registers and access control information of the central processing unit to the hardware resource from the central processing unit via the internal bus, wherein the access control information includes an identification number of the virtual machine which requests said access to the hardware resource, wherein the resource access management module compares the information thus input with information set in the control register included in the resource access management module using the comparison circuit, and controls access to the hardware resource based on the access control information, and wherein the resource access management module further includes another comparison circuit and is configured to control access to the control register using said another comparison circuit.

2. The data processor of claim 1, wherein the control register is configured such that the virtual machine manager can change the information set therein.

3. The data processor of claim 2, wherein in response to receiving a signal for interrupt, the central processing unit constitutes the virtual machine manager and determines a factor of the interrupt, wherein when the interrupt factor is determined to be a first interrupt factor, the central processing unit executes an instruction of the operating system to respond to the interrupt, and wherein when the interrupt factor is determined to be a second interrupt factor, the virtual machine manager performs a process to respond to the interrupt.

4. The data processor of claim 1, wherein the virtual machine ID register specifies one of the plurality of virtual machines;

the CPU operating mode register indicates, on the plurality of virtual machines, whether the application program can be run, and whether the operating system can be run; and the expanded CPU operating mode register indicates whether to form the virtual machine manager or to form the virtual machine.

5. The data processor of claim 4, wherein the number of the central processing unit is plural, and wherein the access control information to the hardware resource, output by the central processing units, includes identification code information of the central processing unit in question.

6. The data processor of claim 5, wherein the control register has a register region for storing identification code information of the central processing unit constituting the virtual machine having permission to access a memory region as the hardware resource.

7. The data processor of claim 6, wherein the control register has a register region for storing address offset information for a memory region specific to the virtual machine with respect to a head address of the memory region as the hardware resource.

8. The data processor of claim 1, further comprising:

a memory and I/O circuits as hardware resources connected to the resource access management module, wherein the data processor is comprised of one semiconductor chip.

9. The data processor of claim 1, wherein the resource access management module is configured to control access to the control register based on a state of an access authority signal.

10. A data processor comprising:

a plurality of central processing units each of which can run a program conforming to a set operating mode under control of different operating systems, each said central processing unit including a virtual machine identification (ID) register, a CPU operating mode register, and an expanded CPU operating mode register;

a resource access management module which manages access to a hardware resource available for the plurality of central processing units, said resource access management module including a control register and a comparison circuit, wherein the control register stores read protect information and write protect information for each respective virtual machine to access the hardware resource; and an internal bus connecting the plurality of central processing units and the resource access management module, wherein the resource access management module accepts, as inputs, information corresponding to the set operating mode, and access control information of the plurality of central processing units to the hardware resource from at least one of the central processing units via the internal bus, wherein the access control information includes an identification number of the virtual machine which requests said access to the hardware resource, wherein the resource access management module compares the information thus input with information set in the control register included in the resource access management module using the comparison circuit, and permits access the hardware resource based on the access control information, and wherein the resource access management module further includes another comparison circuit and is configured to control access to the control register using said another comparison circuit.

11. The data processor of claim 10, wherein the operating mode is one selected from a group consisting of a first operating mode, a second operating mode and a third operating mode, wherein in the first operating mode, the plurality of central processing units follow an application program to execute an instruction, wherein in the second operating mode, the plurality of central processing units follow an operating system to execute an instruction, and wherein in the third operating mode, the execution of an instruction in the first operating mode and the execution of an instruction in the second operating mode are controlled.

12. The data processor of claim 11, wherein the control register can be changed in the third operating mode.

13. The data processor of claim 12, wherein the central processing unit transfers to the third mode and determines an interrupt factor upon receiving an interrupt signal, wherein when the interrupt factor is determined to be a first interrupt factor, the central processing unit transfers to the second mode, and executes an instruction of the operating system to respond to the interrupt, and wherein when the interrupt factor is determined to be a second interrupt factor, the central processing unit executes an instruction of the management program to perform a process to respond to the interrupt.

14. The data processor of claim 10, further comprising:

a memory and I/O circuits as hardware resources connected to the resource access management module, wherein the data processor is comprised of one semiconductor chip.

15. The data processor of claim 10, wherein the resource access management module is configured to control access to the control register based on a state of an access authority signal.

* * * * *